(12) United States Patent
Holland

(10) Patent No.: US 9,034,187 B2
(45) Date of Patent: May 19, 2015

(54) APPARATUS FOR PREVENTING SCALE DEPOSITS AND REMOVING CONTAMINANTS FROM FLUID COLUMNS

(71) Applicant: Wilsa, Inc., Houston, TX (US)

(72) Inventor: Herbert William Holland, Houston, TX (US)

(73) Assignee: Wilsa Holdings, LLC, Houston, TX (US)

( * ) Notice: Subject to any disclaimer, the term of this patent is extended or adjusted under 35 U.S.C. 154(b) by 0 days.

(21) Appl. No.: 14/466,639

(22) Filed: Aug. 22, 2014

(65) Prior Publication Data

US 2014/0360928 A1    Dec. 11, 2014

Related U.S. Application Data

(60) Continuation of application No. 14/319,824, filed on Jun. 30, 2014, which is a division of application No. 13/317,628, filed on Oct. 22, 2011, now Pat. No. 8,778,177, which is a continuation of application No. 12/655,196, filed on Dec. 26, 2009, now Pat. No. 8,043,511, which is a continuation of application No. 12/215,745, filed on Jun. 29, 2008, now Pat. No. 8,048,313, which is a continuation-in-part of application No. 11/054,131, filed on Feb. 10, 2005, now Pat. No. 7,407,589.

(51) Int. Cl.
| | |
|---|---|
| *B03C 1/02* | (2006.01) |
| *B01D 35/06* | (2006.01) |
| *C02F 1/48* | (2006.01) |
| *C02F 5/00* | (2006.01) |
| *B03C 1/033* | (2006.01) |
| *B03C 1/28* | (2006.01) |
| *C02F 101/32* | (2006.01) |
| *C02F 103/02* | (2006.01) |
| *C02F 103/10* | (2006.01) |

(52) U.S. Cl.
CPC . *B03C 1/02* (2013.01); *C02F 1/487* (2013.01); *C02F 2101/32* (2013.01); *C02F 2201/483* (2013.01); *C02F 2303/22* (2013.01); *B01D 35/06* (2013.01); *C02F 1/48* (2013.01); *C02F 1/484* (2013.01); *B03C 1/0335* (2013.01); *B03C 1/288* (2013.01); *B03C 2201/18* (2013.01); *C02F 1/485* (2013.01); *C02F 5/00* (2013.01); *C02F 2103/02* (2013.01); *C02F 2103/023* (2013.01); *C02F 2103/10* (2013.01)

(58) Field of Classification Search
CPC ........ B03C 1/02; B03C 1/0335; B03C 1/288; B01D 35/06; C02F 1/48; C02F 1/484; C02F 1/485; C02F 1/487; C02F 5/00; C02F 2101/32; C02F 2103/02; C02F 2103/10; C02F 2103/23; C02F 2201/18; C02F 2201/483; C02F 2303/22
See application file for complete search history.

(56) References Cited

U.S. PATENT DOCUMENTS 4,938,875 A * 7/1990 Niessen ................. 210/222
5,074,998 A * 12/1991 De Baat Doelman ........ 210/222

* cited by examiner

*Primary Examiner* — David A Reifsnyder
(74) *Attorney, Agent, or Firm* — Dunlap Codding, P.C.

(57) ABSTRACT

An apparatus for providing magnetic fluid treatment is described. The apparatus includes a serial coupling of conduit segments forming a conduit. At least two of the conduit segments are constructed of a magnetically conductive material and at least one of the conduit segments is constructed of a non-magnetically conductive material and positioned in between the conduit segments constructed of the magnetically conductive material to establish a non-magnetically conductive region. At least one electrical conductor encircles at least a section of the outer surface of the serial coupling of conduit segments. Energizing the electrical conductor establishes a magnetic field having lines of flux directed along a flow path of the conduit and concentrated in the non-magnetically conductive region of the conduit.

24 Claims, 9 Drawing Sheets

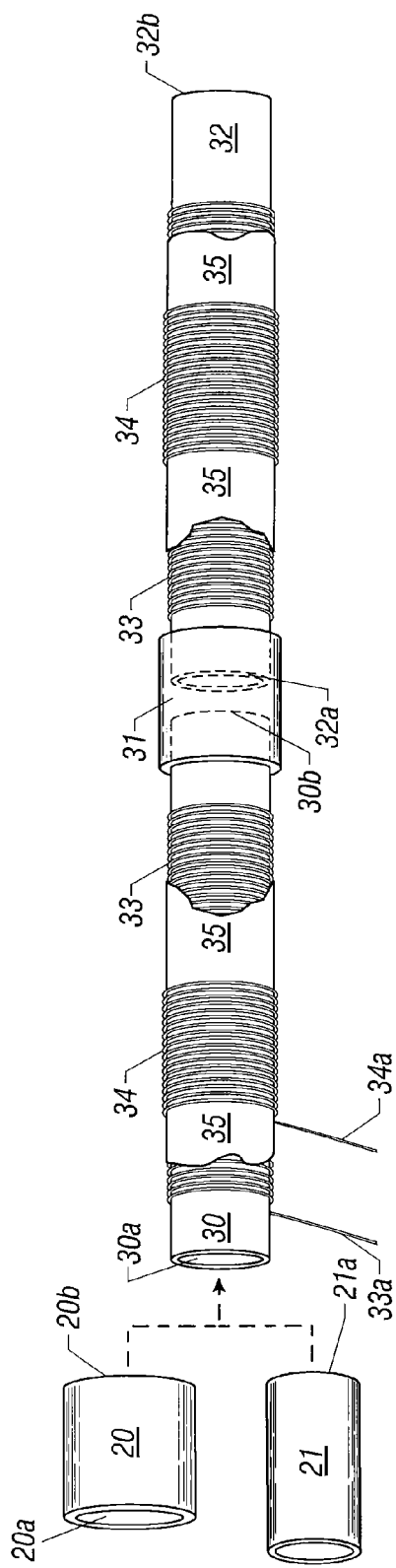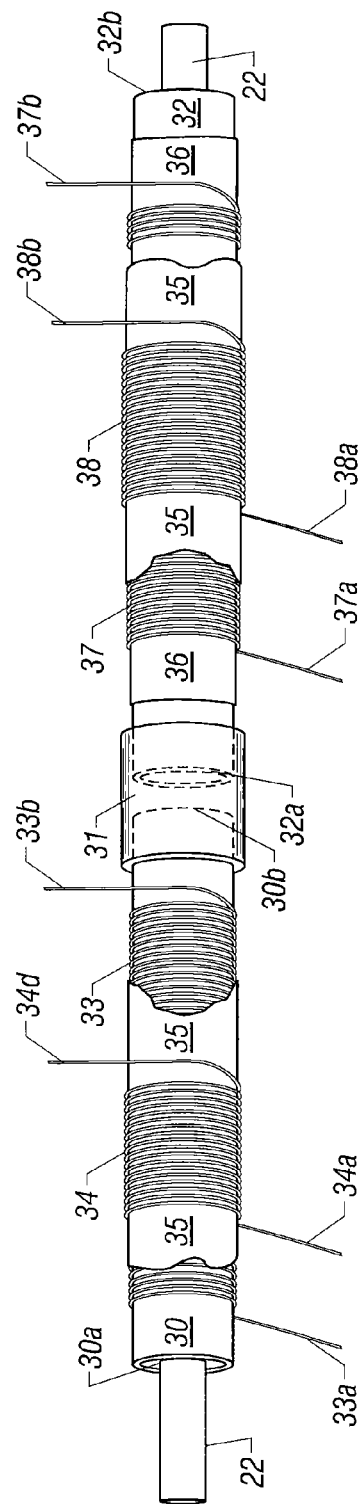
FIG. 3
FIG. 3A

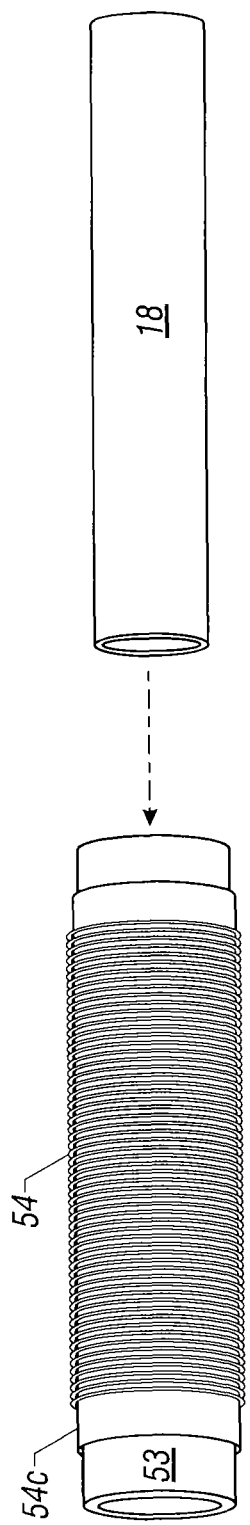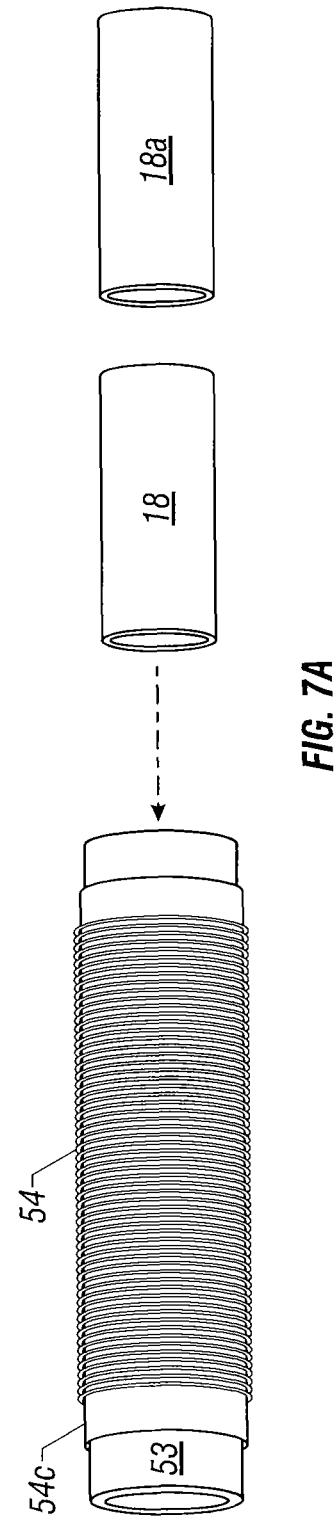

APPARATUS FOR PREVENTING SCALE DEPOSITS AND REMOVING CONTAMINANTS FROM FLUID COLUMNS

INCORPORATION BY REFERENCE

The present patent application is a continuation of a patent application identified by U.S. Ser. No. 14/319,824, filed on Jun. 30, 2014, still pending, which is a divisional of the patent application identified by U.S. patent application Ser. No. 13/317,628, filed Oct. 22, 2011, which issued as U.S. Pat. No. 8,778,177, which is a continuation of U.S. Ser. No. 12/655, 196, which issued as U.S. Pat. No. 8,043,511, which is a continuation in part of U.S. Ser. No. 12/215,745, which issued as U.S. Pat. No. 8,048,313, which is a continuation in part of U.S. Ser. No. 11/054,131, which issued as U.S. Pat. No. 7,407,589, the disclosures of which are hereby incorporated by reference in their entireties.

In addition, the disclosed concepts contained in paragraphs 85-92, 135-139, and 144-186 and figures referred to thereby of U.S. patent application Ser. No. 13/924,163 filed Jun. 21, 2013, which issued as U.S. Pat. No. 8,784,667, are hereby incorporated by reference in their entireties.

BACKGROUND OF THE INVENTION

The instant invention relates to a method and apparatus for treating fluid columns to prevent the formation of scale and other flow restricting deposits within conduits utilized in the transmission of fluids. The instant method and apparatus may also be utilized to extract deposits from the surfaces of conduits and other components of fluid transmission systems, accelerate the separation of contaminants from a fluid and reduce the amount of chemicals required for the maintenance, treatment and processing of many fluids. The instant invention also provides for the separation of contaminants and other components that comprise a fluid column receptive to magnetic treatment.

Thermal exchange systems comprising components such as boilers, heat exchangers and cooling towers utilize water as a heat transfer medium. Suspended and dissolved minerals precipitate out of the water and accumulate as deposits of scale on the surfaces of thermal exchange system components and restrict the flow of water, act as insulation that inhibits heat transfer from one surface to another, impede the operation of equipment and increase energy consumption as the fouled systems lose efficiency and labor to meet operational parameters. Fouled heat exchange systems must undergo descaling processes to recover lost productivity and reduce energy consumption at a significant expense, not only for the cost of cleaning system components but also for lost productivity while a facility is out of service as the fouled thermal exchange system is descaled. Chemical treatment is a common means of controlling scale, corrosion, algae, bacteria and other biological contaminants in thermal exchange systems and is also commonly used to remove suspended or dissolved solid contaminants from process water, make-up water, industrial storm water and wastewater. Utilization of chemicals is costly, requires the storage, handling and dispensing of dangerous substances and poses increasing environmental concerns. As chemicals, minerals and other contaminants accumulate in thermal exchange systems, the water becomes unsuitable for continued use and a fresh supply of water is required for the ongoing operation of such systems. Contaminant laden water from such systems typically incurs large surcharges for wastewater disposal due to the treatment needed to render the water suitable for discharge into the environment.

In petroleum production, water, paraffin and minerals entrained in petroleum production fluids extracted from oil producing formations are separated from marketable oil by bulk recovery apparatus. Water extracted from crude oil is typically returned to the formation while recovered petroleum containing residual amounts of water and contaminants is transported to a refinery for processing into commodities. Over time, deposits of scale and other contaminants form within the separation equipment used to remove water from oil, conduits utilized to return water to the formation and pipelines used to transport crude oil to a refinery; resulting in restricted fluid flow, limited capacity of fluid transmission systems and the deterioration of pumps, valves, meters and other equipment. Productivity is lost when costly physical cleaning and chemical remediation are required to restore full flow to petroleum production and transmission systems. Refineries, as well as other industrial complexes, are constantly challenged with remediation of hydrocarbon contaminants that migrate into storm water and wastewater systems.

The use of magnetic flux to treat fluid columns is one alternative to chemical treatment of fluids. However, prior art magnetic field generators are challenged by a number of deficiencies.

One type of prior art magnetic field generator utilizes a fixed array of rare earth magnets proximate the flow path of a fluid to provide fluid treatment. A primary factor in achieving effective treatment with such devices is matching a constant velocity of a fluid to be treated to the configuration of the magnets and diameter of the flow path extending through the array of magnets. If the velocity of the fluid fails to match the configuration of the permanent magnets, such prior art devices typically fail to provide effective fluid treatment.

Another type of prior art magnetic field generator is an electromagnet formed by coiling a length of wire around a conduit and energizing the coiled wire with a supply of electrical power to generate a magnetic field. A basic principal of electromagnetic field generation states the strength of the magnetic field is proportional to the number of turns of wire forming the coil multiplied by the amount of electrical current, or amperage, flowing through to the coil; this is commonly referred to as the amp-turns of the device. Magnetic energy generated by such devices is commonly measured in Tesla or gauss units. Magnetic fluid treatment is typically most effective when high levels of gauss are generated by increasing the supply of voltage to the coil so more current flows through the coil, increasing the number of turns in the coil or increasing both the number of turns in the coil and the voltage supplied to the coil. However, electrically energized coils generate heat, and the generation and retention of heat produced by the energized coil of an electromagnet has been a major limitation in the development of prior art devices attempting to generate high gauss for fluid treatment.

Heat generated by an energized coil and the accompanying heat retention of the coil increase its resistance to the flow of current through the coil of wire and effectively reduces gauss generation. Heat retention commonly leads to the failure of prior art electromagnet devices when an overheated coil melts and creates a short circuit generating little magnetic energy, or separates and creates an open circuit generating no magnetic energy. In many instances, prior art apparatus attempt to reduce heat generation by reducing the amount of voltage used to energize their coils. However, reducing the voltage and the associated flow of current through a coil results in fewer amp-turns of a prior art device, resulting in substantially lower gauss generation. The low strength of the magnetic energy provided by such devices typically results in ineffective fluid treatment.

Another prior art method and apparatus use a length of wire coiled around the outer surface of a pipe to form an antenna that is then energized with electrical energy switched on and off at a frequency of 2 kHz-20 kHz in an effort to replace chemical treatment, but are challenged by a number of deficiencies. Energizing an antenna with electrical energy continuously switched on and off at a frequency of 2 kHz-20 kHz generates a signal that radiates from the coiled wire, and because the signal radiates from the antenna only a limited area of the flow channel within the pipe receives the signal. Prior art apparatus attempt to treat pipes greater than 1" in diameter by amplifying their signals to treat broader cross sections within larger pipes. Amplification merely results in the signal radiating farther from the coiled wire and typically fails to treat a broader cross section within a large diameter conduit. Further, such prior art devices fail to shield the signals they generate and are susceptible to interference from stronger signals of other devices that can limit the efficiency of the fluid treatment they provide. The unshielded signals of prior art devices also radiate from the coil and may interfere with radio controlled devices, such as apparatus utilized in telemetering data and equipment.

SUMMARY OF THE INVENTION

U.S. Pat. Nos. 6,706,196, 6,730,205, 6,852,235 and 7,407,589 and U.S. Patent Application No. 20080264869 disclose fluid treatment methods and apparatus utilizing magnetic energy concentrated in a plurality of distinct areas along a fluid flow path. The synergy of concentrated magnetic energy in concert with methods and apparatus of pulsed fluid treatment providing at least one region of pulsed fluid treatment within a fluid treatment chamber has been discovered to improve a wide variety of fluid treatment applications.

The instant invention includes a method of providing fluid treatment comprising the steps of directing a flow of a feed stream to be treated through a magnetically energized conduit providing magnetic energy concentrated in a plurality of distinct areas, directing the flow of fluid to pass through a fluid treatment vessel providing at least one region of pulsed fluid treatment within a fluid treatment chamber and coupling the magnetically energized conduit with the fluid treatment vessel for fluid flow between them.

The instant method of magnetic field treatment comprises providing a magnetically conductive conduit, said magnetically conductive conduit comprising at least one length of magnetically conductive material and having a port at the proximal end of the conduit and a port at the distal end of the conduit, each length of magnetically conductive material defining a fluid impervious boundary wall with an inner surface and an outer surface and having a port at one end of the length of magnetically conductive material and a port at the other end of the length of magnetically conductive material; providing at least one non-magnetically conductive fluid flow conduit, each fluid flow conduit comprising a length of non-magnetically conductive material defining a fluid impervious boundary wall with an inner surface and an outer surface and having inlet and outlet ports; providing an electrical conductor, said electrical conductor comprising at least one length of an electrical conducting material having a first conductor lead and a second conductor lead; coiling the electrical conductor with at least one turn to form at least one uninterrupted coil of electrical conductor, each coil forming at least one layer of coiled electrical conductor; providing means for sleeving the magnetically conductive conduit within the coiled electrical conductor, whereby at least one turn of electrical conductor encircles at least a section of the outer surface of said magnetically conductive conduit; and providing means for deploying the at least one fluid flow conduit proximate the magnetically conductive conduit to promote a flow of a fluid to be treated through the magnetically conductive conduit.

The instant method of magnetic field treatment further comprises connecting the conductor leads of the coiled electrical conductor to at least one electrical power supply, said at least one electrical power supply having a capacity to energize the coiled electrical conductor and produce a magnetic field having energy substantially confined within the boundary wall of the magnetically conductive conduit, said magnetic field extending beyond each end of said magnetically conductive conduit and having energy concentrated in a plurality of distinct areas along the longitudinal axis of the magnetically energized conduit; introducing a feed stream comprising a fluid column receptive to magnetic treatment to the inlet port of the at least one fluid flow conduit to establish a flow of a fluid to be treated through the port at the proximal end of the magnetically energized conduit; directing the flow to pass through the plurality of distinct areas of concentrated magnetic energy; and discharging the feed stream exiting from the port at the distal end of the magnetically energized conduit a processed fluid.

The instant method of pulsed fluid treatment comprises providing a fluid treatment vessel defining a fluid impervious boundary wall with an inner surface and having a fluid input port and a fluid output port, the inner surface of said fluid impervious boundary wall establishing a fluid treatment chamber; providing at least one transducer to direct pulsed fluid treatment proximate at least one distinct region within the fluid treatment chamber, said at least one transducer having a first conductor lead and a second conductor lead; providing at least one electrical energizing unit having a capacity to produce at least one distinct programmable output of electrical energy continuously switched on and off at a pulsed repetition rate to establish at least one pulsed electrical signal; providing at least one shielding material member, at least one shielding material member each having a capacity to restrict radiation of the at least one pulsed electrical signal, said at least one shielding material member further reducing external interference with said at least one pulsed electrical signal; providing means for deploying the at least one transducer within the fluid treatment chamber; providing means for deploying the at least one shielding material member to restrict propagation of the at least one pulsed electrical signal.

The instant method of pulsed fluid treatment further comprises connecting the conductor leads of the at least one transducer to the at least one electrical energizing unit to energize said at least one transducer with at least one pulsed electrical signal and thereby produce pulsed fluid treatment proximate at least one distinct region within the fluid treatment chamber; introducing a feed stream comprising a fluid column receptive to pulsed fluid treatment to the fluid inlet port of the fluid treatment vessel to establish a flow of the fluid to be treated through the fluid treatment chamber; directing the fluid to pass through the at least one region of pulsed fluid treatment; and discharging the feed stream exiting from the fluid outlet port of the fluid treatment vessel as a processed fluid.

The instant method of providing fluid treatment further comprises coupling the magnetically energized conduit with the fluid treatment vessel for fluid flow between them. The fluid column to be treated may pass through the fluid treatment vessel prior to passing through the magnetically energized conduit, whereby the feed stream is directed to pass through at least one region of pulsed fluid treatment prior to passing through the plurality of distinct areas of concentrated magnetic energy. The instant method may include one or more of the steps of dispersing a supply of at least one fluid treatment chemical into the feed stream, directing the feed steam to pass through at least one contaminant separation process or directing the feed steam to pass through at least one fluid flow conditioning process.

The means of energizing the coiled electrical conductor, along with the repetition rate, wavelength, amplitude and direction of the at least one pulsed electrical signal, may be adjusted to treat a variety of fluids. The instant invention may be utilized to improve the efficiency of apparatus utilized in solid/liquid phase separation or liquid/liquid separation, such as oil/water separation, and may also be effective in controlling and eliminating many biological contaminants. The instant invention typically will not over treat or under treat a feedstock, requires little monitoring or adjustment for effective fluid treatment and may be utilized in either single pass and/or closed-loop fluid transmission systems.

BRIEF DESCRIPTION OF THE DRAWINGS

The accompanying drawings illustrate the preferred embodiments of the invention in which:

FIG. 3 and FIG. 3A show embodiments of fluid flow conduits promoting the flow of fluid through a serial coupling of conduit segments.

FIG. 7 is an exploded view of a first magnetically conductive conduit adapted to sleeve a second magnetically conductive conduit;

FIG. 7A is an exploded view of a first magnetically conductive conduit adapted to sleeve non-contiguous array of magnetically conductive conduits;

DESCRIPTION OF THE PREFERRED EMBODIMENT

Figure 1:
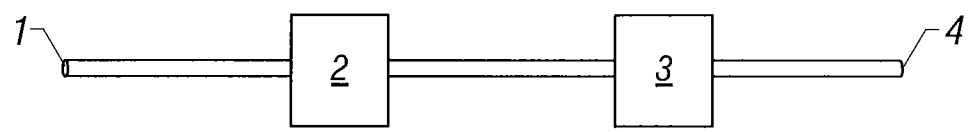
FIG. 1 is a first configuration of the instant invention.

The instant invention includes an apparatus providing fluid treatment comprising a magnetic field treatment device providing magnetic energy concentrated in a plurality of distinct areas, a pulsed fluid treatment device providing at least one region of pulsed fluid treatment and means for coupling the magnetic field treatment device and the pulsed fluid treatment device for fluid flow between them.

The instant magnetic field treatment device comprises a magnetically conductive conduit, said magnetically conductive conduit comprising at least one length of magnetically conductive material and having a port at the proximal end of the conduit and a port at the distal end of the conduit, each length of magnetically conductive material defining a fluid impervious boundary wall with an inner surface and an outer surface and having a port at one end of the length of magnetically conductive material and a port at the other end of the length of magnetically conductive material; at least one non-magnetically conductive fluid flow conduit, each fluid flow conduit comprising a length of non-magnetically conductive material defining a fluid impervious boundary wall with an inner surface and an outer surface and having inlet and outlet ports; an electrical conductor comprising at least one length of an electrical conducting material having a first conductor lead and a second conductor lead, said electrical conductor coiled with at least one turn to form at least one uninterrupted coil of electrical conductor, each coil forming at least one layer of coiled electrical conductor; means for sleeving the magnetically conductive conduit within the coiled electrical conductor, whereby at least one turn of electrical conductor encircles at least a section of the outer surface of said magnetically conductive conduit; means for deploying the at least one non-magnetically conductive fluid flow conduit proximate the magnetically conductive conduit to promote a flow of a fluid to be treated through the magnetically conductive conduit; and at least one electrical power supply having a capacity to energize the coiled electrical conductor and produce a magnetic field having energy substantially confined within the boundary wall of the magnetically conductive conduit, said magnetic field extending beyond each end of said magnetically conductive conduit and having energy concentrated in a plurality of distinct areas along the longitudinal axis of the magnetically energized conduit.

The instant pulsed fluid treatment device comprises a fluid treatment vessel defining a fluid impervious boundary wall with an inner surface and having a fluid input port and a fluid output port, the inner surface of said fluid impervious boundary wall establishing a fluid treatment chamber; at least one transducer to direct pulsed fluid treatment proximate at least one distinct region within the fluid treatment chamber, said at least one transducer having a first conductor lead and a second conductor lead; means for deploying the at least one transducer within the fluid treatment chamber; at least one electrical energizing unit coupled to the at least one transducer, said at least one electrical energizing unit providing at least one distinct programmable output of electrical energy continuously switched on and off at a pulsed repetition rate to establish at least one pulsed electrical signal to energize the at least one transducer and thereby produce pulsed fluid treatment; at least one shielding material member, each at least one shielding material member having a capacity to restrict radiation of the at least one pulsed electrical signal, said at least one shielding material member further reducing external interference with said at least one pulsed electrical signal; and means for deploying the at least one shielding material member to restrict propagation of the at least one pulsed electrical signal.

FIG. 1 is a first configuration of the instant invention wherein a magnetic field treatment device is shown coupled to a pulsed fluid treatment device for fluid flow between them. A feed stream receptive to fluid treatment introduced to port 1 may be directed to pass through a plurality of distinct areas of concentrated magnetic energy provided by magnetic field treatment device 2 and then pass through at least one region of pulsed fluid treatment provided by pulsed fluid treatment device 3 before being discharged from port 4 as a processed fluid.

A feed stream receptive to fluid treatment may be directed to make a single pass through the magnetic field treatment device and a single pass through the pulsed fluid treatment device, or a processed fluid may be directed to make an additional pass through both treatment devices. Further, a processed fluid may be directed to make an additional pass through the magnetic field treatment device or the pulsed fluid treatment device to receive additional fluid treatment.

In some applications, a feed stream may be directed to pass through the magnetic field treatment device and the pulsed fluid treatment device as a continuous flow of fluid, but in other instances a feed stream may be directed to flow through the magnetic field treatment device and into an embodiment of the fluid treatment vessel comprising a collection basin, settling tank, retention pond or similar type of reservoir to allow for gravity separation of suspended and dissolved solids in the feed stream prior to discharging the processed fluid from said fluid treatment vessel. At least one transducer may be deployed within the fluid treatment chamber of this embodiment of the fluid treatment vessel to direct pulsed fluid treatment to fluid retained within said reservoir.

Further, at least one chemical dispersing apparatus may be configured to distribute a supply of at least one fluid treatment chemical into a feed stream, at least one contaminant separation apparatus may be configured to separate and collect contaminants or at least one fluid flow conditioning apparatus providing means for altering the flow of a fluid may be configured upstream of the magnetic field treatment device, downstream of the magnetic field treatment device, upstream of the pulsed fluid treatment device or downstream of the pulsed fluid treatment device.

Figure 1A:
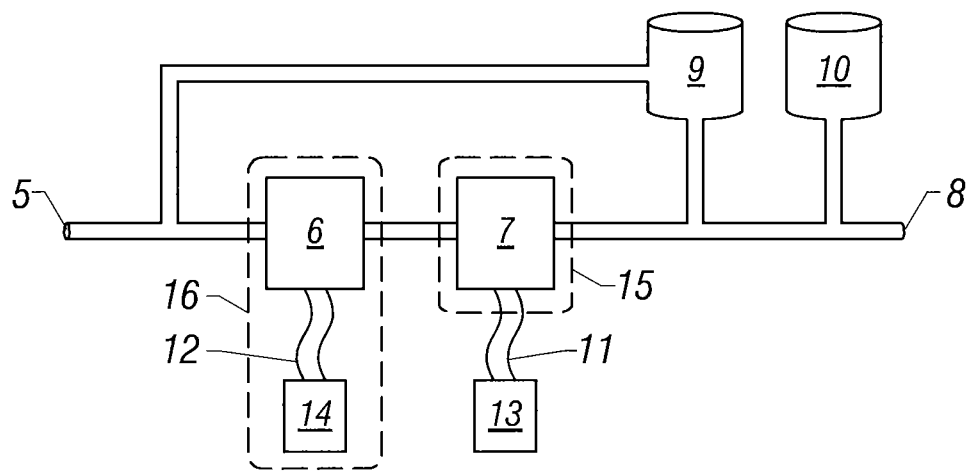
FIG. 1A is a second configuration of the instant invention.

FIG. 1A shows a second configuration of the instant invention wherein means for coupling the magnetic field treatment device and the pulsed fluid treatment device directs a feed stream to pass through at least one region of pulsed fluid treatment prior passing through the plurality of distinct areas of concentrated magnetic energy.

A feed stream receptive to fluid treatment introduced to port 5 may be directed to pass through at least one distinct region of pulsed fluid treatment within fluid treatment vessel 6. First and second conductor leads 12 of a transducer disposed in the fluid treatment vessel are shown connected to electrical energizing unit 14. Shielding material member 16 is shown enclosing the fluid treatment vessel, conductor leads and electrical energizing unit to restrict propagation of the at least one pulsed electrical signal.

The fluid column may then be directed to pass through magnetic energy concentrated in a plurality of distinct areas along the longitudinal axis of magnetically energized conduit 7. First and second conductor leads 11 of a coiled electrical conductor sleeving at least a section of the magnetically conductive conduit are shown connected to electrical power supply 13 having a capacity to energize the coiled electrical conductor and establish a magnetic field having lines of flux directed along the flow path of the fluid and concentrated in a plurality of distinct areas along the longitudinal axis of the magnetically energized conduit. The lines of flux form a loop and the magnetic field is of a strength that allows the flux to extend along the longitudinal axis of the magnetically conductive conduit and concentrate at distinct points beyond each end of the magnetically conductive conduit such that the magnetic flux loop extends from a point beyond the proximal end of the magnetically energized conduit, around the periphery of the coiled electrical conductor along the longitudinal axis of the magnetically energized conduit and to a point beyond the distal end of the magnetically energized conduit.

An enclosure may be utilized to protect at least the coiled electrical conductor. Housing 15 comprising a magnetically conductive material is shown enclosing magnetically energized conduit 7 to restrict the propagation of the lines of flux and the magnetic field generated by the energized coil and the magnetically energized conduit. The processed fluid may then be discharged from port 8 in a single pass application or directed to containment vessel 9 of a closed-loop system to allow for additional circulation through the fluid treatment devices. A processed fluid may also be directed to collection basin 10 for additional processing of the fluid.

Figure 2:
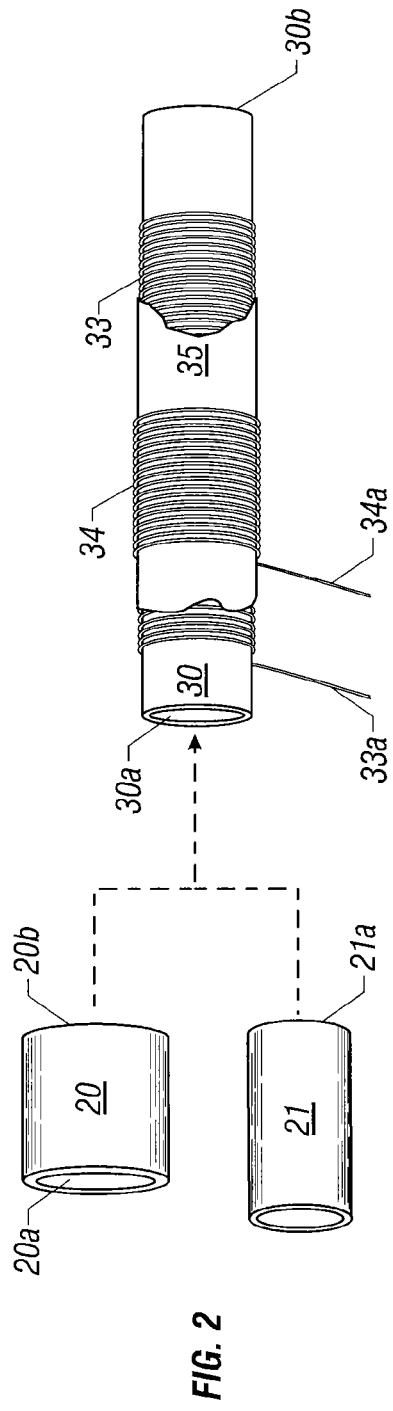
FIG. 2 and FIG. 2A show embodiments of fluid flow conduits promoting the flow of fluid through a magnetically conductive conduit.

FIG. 2 shows a first embodiment of the magnetically conductive conduit 10 comprising a length of magnetically conductive material defining a fluid impervious boundary wall with an inner surface and an outer surface and having port 10a at the proximal end of the conduit and port 10b at the distal end of the conduit. A single length of electrical conducting material is shown forming first coil layer 33 and second layer 34 encircling the outer surface of the magnetically conductive conduit with non-magnetic stabilizer 35 shown disposed between the coil layers. Conductor leads 33a and 34a may be connected to at least one supply of electrical power to energize the coiled electrical conductor and establish a magnetic field having lines of flux directed along the flow path of the fluid and concentrated in a plurality of distinct areas along the longitudinal axis of the magnetically energized conduit.

Introducing a feed stream to port 30a directs fluid to pass through a first area of magnetic treatment concentrated at port 30a at the proximal end of the magnetically energized conduit. The fluid may then pass through a second area of magnetic treatment concentrated along a path extending through at least one turn of electrical conducting material forming the first and second coil layers encircling the outer surface of the magnetically conductive conduit and then pass through a third area of magnetic treatment concentrated at port 30b at the distal end of the magnetically energized conduit.

Coupling segment 20 is a first embodiment of a non-magnetically conductive fluid flow conduit to promote a flow of fluid through the magnetically energized conduit, said coupling segment comprising a non-magnetically conductive material defining a fluid impervious boundary wall with an inner surface and an outer surface and having inlet port 20a and outlet port 20b. Outlet port 20b may be adapted to provide for the fluid impervious connection with port 30a of magnetically energized conduit 30, and inlet port 20a may be adapted to provide for the fluid impervious, non-contiguous connection of the magnetically energized conduit with an additional segment of conduit, said non-contiguous connection establishing a non-magnetically conductive region providing for a concentration of magnetic energy at inlet port 30a of the magnetically energized conduit. Further, the non-contiguous connection between the magnetically energized conduit and an additional segment of magnetically conductive conduit establishes a non-magnetically conductive region providing for an increased concentration of magnetic energy in the space between the magnetically conductive conduits. An additional non-magnetically conductive coupling segment may similarly provide for the connection of port 30b of the magnetically energized conduit with an additional segment of conduit.

Non-magnetically conductive conduit 21 is a second embodiment of a non-magnetically conductive fluid flow conduit to promote a flow of fluid through the magnetically energized conduit, said fluid flow conduit comprising a non-magnetically conductive material defining a fluid impervious boundary wall with an inner surface and an outer surface and having port 21*a* adapted to provide for the fluid impervious connection of said fluid flow conduit with port 30*a* of magnetically energized conduit 30, whereby said connection establishes a non-magnetically conductive region providing for a concentration of magnetic energy at port 30*a* of the magnetically energized conduit. An additional segment of non-magnetically conductive fluid flow conduit may similarly be adapted to provide a fluid impervious connection with port 30*b* of the magnetically energized conduit.

Figure 2A:
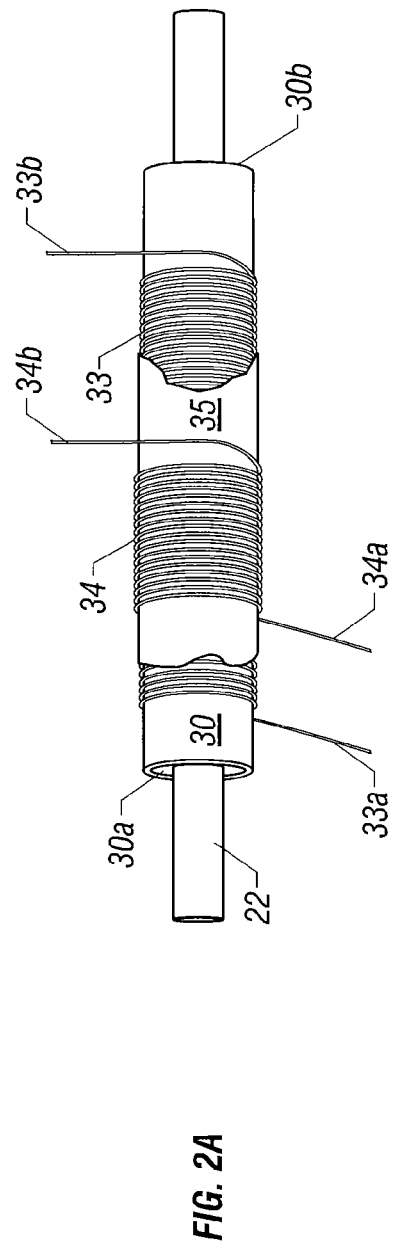

FIG. 2A shows a first length of electrical conducting material forming coil layer 33 and a second length of electrical conducting material forming coil layer 34 encircling magnetically conductive conduit 30. Non-magnetic stabilizer 35 is shown disposed between the layers of electrical conducting material to maintain the alignment of the coaxially disposed coil layers. First conductor lead 33*a* and second conductor lead 33*b* of the first coil layer and first conductor lead 34*a* and second conductor lead 34*b* of the second coil layer may be connected in series to at least one supply of electrical power, or connected in parallel to at least one supply of electrical power, to energize the coiled electrical conductors and establish a magnetic field having lines of flux directed along the flow path of the fluid and concentrated in a plurality of distinct areas along the longitudinal axis of the magnetically energized conduit.

Further, the first and second conductor leads of the first length of electrical conducting material may be connected to a first at least one supply of electrical power and the first and second conductor leads of the second length of electrical conducting material may be connected to a second at least one supply of electrical power to energize the coils.

Fluid flow conduit 22 is a third embodiment of a non-magnetically conductive fluid flow conduit to promote a flow of fluid through the magnetically conductive conduit, said fluid flow conduit defining a section of conduit within a piping system comprising a non-magnetically conductive material sleeved within port 30*a* at the proximal end of the magnetically energized conduit, the boundary wall of magnetically conductive conduit 30 and port 30*b* at the distal end of the magnetically energized conduit, said fluid flow conduit comprising a length of non-magnetically conductive material defining a fluid impervious boundary wall with an inner surface and an outer surface and having inlet and outlet ports.

Introducing a feed stream to the inlet port of fluid flow conduit 22 directs fluid to pass through a first area of magnetic treatment concentrated at port 30*a* at the proximal end of magnetically energized conduit 30, through a second area of magnetic treatment concentrated along a path extending through each turn of electrical conducting material encircling the outer surface of the magnetically conductive conduit and then pass through a third area of magnetic treatment concentrated at port 30*b* at the distal end of the magnetically energized conduit.

A non-magnetically conductive fluid flow conduit may also be sleeved within a second embodiment of the magnetically conductive conduit comprising a non-contiguous array of a first segment of magnetically conductive conduit and a second segment of magnetically conductive conduit, whereby a space between the port at the distal end of the first segment of magnetically conductive conduit and the port at the proximal end of the second segment of magnetically conductive conduit establishes a non-magnetically conductive region between the magnetically conductive conduit segments. The non-magnetically conductive region between the magnetically conductive conduit segments provides for a concentration of magnetic energy in the space between the segments of magnetically conductive conduit. A spacer may be used to maintain the non-magnetically conductive region between the magnetically conductive conduit segments, said spacer comprising a non-magnetically conductive material disposed between the magnetically conductive conduit segments.

A third embodiment of the magnetically conductive conduit may comprise a serial coupling of a magnetically conductive inlet conduit segment, a non-magnetically conductive intermediate conduit segment and a magnetically conductive outlet conduit segment, each conduit segment comprising a length of material defining a fluid impervious boundary wall with an inner surface and an outer surface and having a port at the proximal end of the conduit segment and a port at the distal end of the conduit segment. The serial coupling of magnetically conductive inlet conduit segment 30, non-magnetically conductive intermediate conduit segment 31 and magnetically conductive outlet conduit segment 32 shown in FIG. 3 establishes a non-magnetically conductive region between the magnetically conductive conduit segments that provides for a concentration of magnetic energy in the area between the distal port of the magnetically conductive inlet conduit segment and the proximal port of the magnetically conductive outlet conduit segment conduit that is greater than the magnetic energy concentrated at the proximal port of the magnetically conductive inlet conduit segment and the distal port of the magnetically conductive outlet conduit segment conduit.

A single length of electrical conducting material is shown forming first coil layer 33 and second coil layer 34 encircling magnetically conductive inlet conduit segment 30, non-magnetically conductive intermediate conduit segment 31 and magnetically conductive outlet conduit segment 32. Non-magnetic stabilizer 35 is shown disposed between the coil layers to maintain the alignment of the coaxially disposed coil layers. First conductor lead 33*a* and second conductor lead 34*a* may be connected to at least one supply of electrical power to energize the coiled electrical conductor and establish a magnetic field having lines of flux directed along the flow path of the fluid and concentrated in a plurality of distinct areas along the longitudinal axis of the magnetically energized inlet conduit segment and magnetically energized outlet conduit segment.

Introducing a feed stream comprising a fluid column receptive to magnetic treatment to port 30*a* directs the flow of fluid to pass through a first area of magnetic treatment concentrated at port 30*a* at the proximal end of magnetically energized inlet conduit segment 30. The flow may then pass through a second area of magnetic treatment concentrated along a path extending through at least one turn of the coiled electrical conductor encircling the outer surface of magnetically energized inlet conduit segment 30 and then pass through a third area of magnetic treatment concentrated in the space between port 30*b* at the distal end of the magnetically energized inlet conduit segment and port 32*a* at the proximal end of the magnetically energized outlet conduit segment.

The flow may then pass through a fourth area of magnetic treatment concentrated along a path extending through at least one turn of the coiled electrical conductor encircling the outer surface of magnetically energized outlet conduit segment 32 and then pass through a fifth area of magnetic treatment concentrated at port 32*b* at the distal end of the magnetically energized outlet conduit segment.

Coupling segment 20 is a first embodiment of a non-magnetically conductive fluid flow conduit to promote a flow of fluid through the magnetically energized serial coupling of conduit segments, said coupling segment comprising a non-magnetically conductive material defining a fluid impervious boundary wall with an inner surface and an outer surface and having inlet port 20*a* and outlet port 20*b*. Outlet port 20*b* may be adapted to provide for the fluid impervious connection with port 30*a* of magnetically energized inlet conduit segment 30 and inlet port 20*a* may be adapted to provide for the fluid impervious, non-contiguous connection of the magnetically energized inlet conduit segment with an additional segment of conduit, said non-contiguous connection establishing a non-magnetically conductive region providing for a concentration of magnetic energy at inlet port 30*a* of the magnetically energized inlet conduit segment. Further, the non-contiguous connection between magnetically energized inlet conduit segment 30 and an additional segment of magnetically conductive conduit establishes a non-magnetically conductive region providing for an increased concentration of magnetic energy in the space between the magnetically conductive conduits. An additional non-magnetically conductive coupling segment may similarly provide for the connection of port 32*b* of magnetically conductive outlet conduit segment 32 with an additional segment of conduit.

Non-magnetically conductive conduit 21 is a second embodiment of a non-magnetically conductive fluid flow conduit to promote a flow of fluid through the magnetically energized conduit, said fluid flow conduit comprising a non-magnetically conductive material defining a fluid impervious boundary wall with an inner surface and an outer surface and having port 21*a* adapted to provide for the fluid impervious connection of said fluid flow conduit with port 30*a* of magnetically energized inlet conduit segment 30, whereby said connection establishes a non-magnetically conductive region providing for a concentration of magnetic energy at port 30*a* of the magnetically energized inlet conduit segment. An additional segment of non-magnetically conductive fluid flow conduit may similarly be adapted to provide a fluid impervious connection with port 32*b* of the magnetically energized outlet conduit segment.

FIG. 3A shows a first length of electrical conducting material forming first coil layer 33 having conductor leads 33*a* and 33*b* encircling magnetically conductive inlet conduit segment 30 and a second length of electrical conducting material forming second coil layer 34 having conductor leads 34*a* and 34*b* encircling first coil layer 33. A third length of electrical conducting material forming a first coil layer 37 having conductor leads 37*a* and 37*b* is shown encircling coil core 36 and a fourth length of electrical conducting material forming second coil layer 38 having conductor leads 38*a* and 38*b* is shown encircling first coil layer 37. Non-magnetic stabilizer 35 is shown disposed between the layers of coiled electrical conducting material to maintain the alignment of the layers.

Coil core 36 is shown sleeving magnetically conductive outlet conduit segment 32, said coil core comprising a tubular conduit defining a boundary wall with an inner surface and an outer surface and having a port at the proximal end of the tube and a port at the distal end of the tube, the outer surface of said boundary wall adapted to receive the coiled electrical conductor and the ports at each end of the tube and the inner surface of said boundary wall adapted to sleeve at least a section of the magnetically conductive conduit, whereby at least a section of the inner surface of the boundary wall of said coil core is coaxially disposed in substantially concentric surrounding relation to at least a section of the outer surface of the boundary wall of said magnetically conductive conduit.

The coil core may comprise a length of magnetically conductive conduit, or a coil core may comprise a non-magnetically conductive material, such as a film of non-magnetic stabilizing material or a non-magnetically conductive tube.

As used herein, means for sleeving the magnetically conductive conduit within the coiled electrical conductor may include coiling the electrical conductor around at least a section of the outer surface of the fluid impervious boundary wall of the magnetically conductive conduit or coiling the electrical conductor around at least a section of the outer surface of the boundary wall of a coil core and sleeving at least a section of the magnetically conductive conduit with the coil core.

Conductor leads 33*a* and 33*b*, 34*a* and 34*b*, 37*a* and 37*b* and 38*a* and 38*b* may be connected in series or parallel to a least one supply of electrical power. Each length of electrical conducting material may also be connected separately, or in combination with at least one additional length of electrical conducting material, to at least one supply of electrical power. Energizing the coiled electrical conductor with at least one supply of electrical power produces an electromagnetic field conducted by the magnetically conductive inlet and outlet conduit segments and concentrated within the inner surface of the fluid impervious boundary wall of each segment of magnetically conductive conduit, said magnetic field extending beyond each end of the magnetically conductive inlet and outlet conduit segments along the longitudinal axis of the magnetically energized serial coupling of conduit segments.

Fluid flow conduit 22 is a third embodiment of a non-magnetically conductive fluid flow conduit to promote a flow of fluid through the serial coupling of conduit segments, said fluid flow conduit defining a section of conduit within a piping system comprising a non-magnetically conductive material sleeved by magnetically conductive inlet conduit segment 30, non-magnetically conductive intermediate conduit segment 31 and magnetically conductive outlet conduit segment 32, said fluid flow conduit comprising a length of non-magnetically conductive material defining a fluid impervious boundary wall with an inner surface and an outer surface and having inlet and outlet ports.

Introducing a feed stream to the inlet port of fluid flow conduit 22 directs fluid to pass through a first area of magnetic treatment concentrated at port 30*a* at the proximal end of magnetically energized conduit 30, a second area of magnetic treatment concentrated along a path extending through at least one turn of electrical conductor encircling the outer surface of magnetically energized inlet conduit segment 30, a third area of magnetic treatment concentrated in the space between port 30*b* at the distal end of the magnetically energized inlet conduit segment and port 32*a* at the proximal end of the magnetically energized outlet conduit segment, a fourth area of magnetic treatment concentrated along a path extending through at least one turn of electrical conductor encircling the outer surface of magnetically energized outlet conduit segment 32 and a fifth area of magnetic treatment concentrated at port 32*b* at the distal end of the magnetically energized outlet conduit segment.

A fourth embodiment of the magnetically conductive conduit may comprise a sheet of magnetically conductive material rolled into a plurality of layers to form a tube defining a boundary wall with an inner surface and an outer surface and having a port at the proximal end of the tube and a port at the distal end of the tube.

A non-magnetic stabilizing material may also be disposed between the outer surface of a magnetically conductive conduit and the coiled electrical conductor, between the outer surface of a magnetically conductive conduit and the inner surface of a coil core, or between the outer surface of a coil core and the coiled electrical conductor. A non-magnetic stabilizing material may envelope the outer layer of a coiled electrical conductor to maintain the alignment of the coil and protect the coil. The inner and outer surfaces of the fluid impervious boundary wall of a magnetically conductive conduit may be covered with a protective coating to prevent corrosion and extend the functional life of the conduit. At least one end of the fluid impervious boundary wall of a length of magnetically conductive material comprising the magnetically conductive conduit may be tapered.

The electrical conductor may comprise at least one strand of electrical conducting material, such as a length of wire, or may comprise at least one sheet of an electrical conducting foil material.

A single length of electrical conducting material may be coiled to form at least one layer of coiled electrical conductor, or a first length of electrical conducting material may be coiled to form a first layer of coiled electrical conductor and a second length of electrical conducting material may be coiled to form a second layer of coiled electrical conductor. A first length of electrical conducting material and a second length of electrical conducting material may be coiled in a side-by-side and substantially parallel orientation to form at least one layer of coiled electrical conductor.

A first layer of coiled electrical conductor and a second layer of coiled electrical conductor may be coaxially disposed and have a plurality of spacers deployed between said layers to establish radial spacing therebetween. The spacers may be arranged substantially parallel to the longitudinal axis of the magnetically conductive conduit and equidistant to an adjacent spacer to form a pattern of open-air cooling ducts extending substantially parallel to the longitudinal axis of the magnetically conductive conduit, said cooling ducts have a property of acting to dissipate heat from between the first and second coil layers.

A non-contiguous array of a first coil of electrical conducting material and a second coil of electrical conducting material may sleeve a magnetically conductive conduit or sleeve a coil core. The non-contiguous array establishes a space between the first coil and the second coil, whereby an open-air cooling duct is formed between the coils, said cooling duct extending substantially orthogonal to the longitudinal axis of the magnetically conductive conduit and having a property of dissipating heat from between the coils.

In some instances, at least one length of electrical conductor may be coiled around a doughnut shaped core form a toroidal coil. A toroidal coil core may comprise a magnetically conductive material or a non-magnetically conductive material. At least one toroidal coil may sleeve at least a section of the outer surface of the fluid impervious boundary wall of the magnetically conductive conduit or at least a section of the outer surface of the boundary wall of a coil core, whereby said toroidal coil encircles at least a section of said magnetically conductive conduit. Energizing said toroidal coil with at least one electrical power supply having a capacity to produce at least one distinct programmable output of electrical energy continuously switched on and off at a pulsed repetition rate produces a pulsed magnetic field having energy substantially confined within the boundary wall of the magnetically conductive conduit.

Energizing the coiled electrical conductor with at least one pulsed output of electrical energy provides a number of fluid treatment benefits. For example, switching the output of electrical energy to an "off" state for an extended time interval to interrupt the energizing of the at least one coiled electrical conductor allows magnetically conductive debris that may adhere to the inner surface of the fluid impervious boundary wall of a magnetically energized conduit to be dislodged and removed from the conduit by the force of the flow of a fluid passing through said conduit.

Embodiments of the magnetically conductive conduit comprising a non-contiguous array of a first segment and a second segment of magnetically conductive conduit may be sleeved within a coil encircling at least a section of the first segment of magnetically conductive conduit, the non-magnetically conductive region between the magnetically conductive conduit segments and at least a section of the second segment of magnetically conductive conduit or a first coil encircling the first magnetically conductive conduit segment and a second coil encircling the second magnetically conductive conduit segment.

A first non-magnetically conductive fluid flow conduit may be sleeved within the boundary wall of a magnetically energized conduit to direct a first feed stream to pass through a plurality of distinct areas of concentrated magnetic energy and a second section of non-magnetically conductive fluid flow conduit may be sleeved within the boundary wall of the magnetically energized conduit to direct a second feed stream to pass through the plurality of distinct areas of concentrated magnetic energy.

The first and second conductor leads of a length of electrical conducting material may be connected to a single supply of electrical power or connected to a first supply of electrical power and a second supply of electrical power. The at least one electrical power supply may provide a flow of electrical energy having a constant direct current component to energize the coiled electrical conductor and produce a constant magnetic field having energy substantially confined within the boundary wall of the magnetically conductive conduit. In some applications, the at least one electrical power supply may provide at least one pulsed output of electrical energy to energize the coiled electrical conductor and produce a pulsed magnetic field having energy substantially confined within the boundary wall of the magnetically conductive conduit. A pulsed output of electrical energy may have a direct current component or an alternating current component.

The polarity of an output of electrical energy having a constant direct current component may be programmed to optimize the instant magnetic field treatment device for a specific application. One or more of the polarity, time interval, repetition rate, direction or amplitude of a pulsed output of electrical energy may be programmed to optimize the instant magnetic field treatment device for a specific application.

One or more of the voltage, current, direction or repetition rate of the flow of electrical energy may be programmable to provide for effective fluid treatment as the makeup and characteristics of a feedstock change. For example, a first flow of electrical energy having a first set of electrical characteristics may be utilized to provide treatment for a first feedstock having a first makeup, and a second flow of electrical energy having a second set of electrical characteristics may be used to provide treatment for a second feedstock having a second makeup.

Increasing the density and thickness of the fluid impervious boundary wall of the magnetically conductive conduit typically results in a greater concentration of magnetic energy at each end of the magnetically energized conduit and any non-magnetically conductive regions established between segments of magnetically conductive conduit. One means of increasing the density and thickness of the magnetically conductive conduit is a fifth embodiment of the magnetically conductive conduit wherein at least one segment of magnetically conductive conduit is sleeved within another at least one segment of magnetically conductive conduit. For example, a first segment of conduit comprising a magnetically conductive material may sleeve a second segment of conduit comprising a magnetically conductive material, whereby at least a section of the inner surface of the boundary wall of said first segment of magnetically conductive conduit is coaxially disposed in substantially concentric surrounding relation to at least a section of the outer surface of the boundary wall of the second segment of magnetically conductive conduit. This effectively increases the density and thickness of the magnetically conductive conduit.

A first segment of magnetically conductive conduit may also sleeve a second segment of magnetically conductive conduit and a third segment of magnetically conductive conduit. The second and third segments of magnetically conductive conduit may establish a non-magnetically conductive region between the port at the distal end of the second segment of magnetically conductive conduit and the port at the proximal end of the third segment of magnetically conductive conduit, whereby at least a section of the inner surface of the boundary wall of said first segment of magnetically conductive conduit may be coaxially disposed in substantially concentric surrounding relation to at least a section of the outer surface of the boundary wall of the second segment of magnetically conductive conduit and at least a section of the outer surface of the boundary wall of the third segment of magnetically conductive conduit.

A first segment of magnetically conductive conduit may also sleeve a serial coupling of a magnetically conductive inlet conduit segment, a non-magnetically conductive intermediate conduit segment and a magnetically conductive outlet conduit segment, whereby at least a section of the inner surface of the boundary wall of said first segment of magnetically conductive conduit may be coaxially disposed in substantially concentric surrounding relation to the outer surface of the boundary wall of the non-magnetically conductive intermediate conduit segment and at least a section of the outer surface of the boundary wall of the magnetically conductive inlet conduit segment and at least a section of the outer surface of the boundary wall of the magnetically conductive outlet conduit segment. Further, a non-contiguous array of first segment of magnetically conductive conduit sleeving a second segment of magnetically conductive conduit, whereby at least a section of the inner surface of the boundary wall of said first segment of magnetically conductive conduit is coaxially disposed in substantially concentric surrounding relation to at least a section of the outer surface of the boundary wall of the second segment of magnetically conductive conduit; and a fourth segment of magnetically conductive conduit sleeving a third segment of magnetically conductive conduit, whereby at least a section of the inner surface of the boundary wall of said fourth segment of magnetically conductive conduit is coaxially disposed in substantially concentric surrounding relation to at least a section of the outer surface of the boundary wall of the third segment of magnetically conductive conduit, may establish a non-magnetically conductive region between the ports at the distal end of the first and second segments of magnetically conductive conduit and the ports at the proximal end of the third and fourth segments of magnetically conductive conduit.

In large diameter conduits, a magnetically conductive nucleus comprising a magnetically conductive material having an outer surface may be deployed within the aperture of a magnetically energized conduit, whereby the inner surface of the boundary wall of said magnetically energized conduit is coaxially disposed in substantially concentric surrounding relation to the outer surface of said magnetically conductive nucleus. Suspending a magnetically conductive nucleus within the aperture of a magnetically energized conduit promotes a concentration of pulsed magnetic energy across a broader cross section of the fluid flow path within the conduit as the inner surface of the boundary wall of the magnetically energized conduit exerts a concentric attraction to the nucleus. Further, suspending a magnetically conductive nucleus within a non-magnetically conductive region established between segments of magnetically conductive conduit provides for an even greater concentration of pulsed magnetic energy across the cross section of the fluid flow path within the magnetically energized conduit.

A number of variables may be modified to optimize the instant magnetic field treatment device. For example, the size, shape and dimensions of the electrical conducting material, the length to diameter ratio of the coil sleeving the longitudinal axis of the magnetically conductive conduit and the number of layers of coiled electrical conductor may be adapted to optimize the instant magnetic field treatment device for a specific application. Other variables may include the size, shape and types of materials comprising the conduit and coupling devices, the type of flow of electrical energy utilized to energize the coiled electrical conductor and the size, shape and composition of materials comprising an enclosure to protect at least the coiled electrical conductor, if included. A coil core comprising a magnetically conductive material may sleeve a magnetically conductive conduit to increase the density and thickness of the magnetically conductive conduit.

The synergy of using magnetic energy concentrated in a plurality of distinct areas in concert with at least one region of pulsed fluid treatment has been discovered to improve a wide variety of fluid treatment applications.

The electrical energizing unit of the instant pulsed fluid treatment device may establish a pulsed electrical signal having a direct current component. This may be accomplished through a switching sequence comprising initially switching an output of electrical energy to an "on" state during a first time interval to energize at least one transducer with electrical energy flowing from the first conductor lead to the second conductor lead, switching said first output of electrical energy to an "off" state to interrupt the energizing of said at least one transducer, switching an output of electrical energy to the "on" state during a second time interval to energize said at least one transducer with electrical energy flowing from the first conductor lead to the second conductor lead, and switching said second output of electrical energy to the "off" state to interrupt the energizing of said at least one transducer and causing the switching sequence to repeat at a repetition rate.

The electrical energizing unit may also establish a pulsed electrical signal having an alternating current component. This may be accomplished through a switching sequence comprising initially switching an output of electrical energy to an "on" state during a first time interval to energize at least one transducer with electrical energy flowing between the first conductor lead to the second conductor lead in a first direction, switching said first output of electrical energy to an "off" state to interrupt the energizing of said at least one transducer, reversing the direction of the flow of electrical energy, switching an output of electrical energy to the "on" state during a second time interval to energize said at least one transducer with electrical energy flowing between the first conductor lead to the second conductor lead in a second direction, switching said second output of electrical energy to the "off" state to interrupt the energizing of said at least one transducer and causing the switching sequence to repeat at a repetition rate.

An electrical energizing unit establishing a pulsed electrical signal having an alternating current component may also energize at least one transducer through a switching sequence comprising initially energizing said at least one transducer during a first time interval with electrical energy flowing between the first conductor lead to the second conductor lead in a first direction, switching the direction of the flow of electrical energy and energizing said at least one transducer during a second time interval with electrical energy flowing between the first conductor lead to the second conductor lead in a second direction and causing the switching sequence to repeat at a repetition rate.

The electrical energizing unit may have the capacity to vary the time intervals, repetition rate, direction and amplitude of the pulsed electrical signal over the operation range of a transducer to more evenly distribute energy throughout the fluid treatment chamber. The first and second time intervals and the repetition rate may be substantially constant or one or more of the first and second time intervals and the repetition rate may be variable. The electrical energizing unit may have the capacity to vary the pulsed electrical signal over the operation range of a transducer to more evenly distribute energy throughout the fluid treatment chamber. The amplitude of the pulsed electrical signal may be substantially constant or variable. The electrical energizing unit may generate a variety of waveforms including, but not limited to, square waves, sine waves, saw tooth waves, triangle waves or composite waves. At least one of the time interval, repetition rate, waveform, wavelength, amplitude or direction of the output of electrical energy may be established according to one or more of the composition of the fluid, material comprising the fluid treatment vessel, dimensions of the fluid treatment vessel, embodiment of the at least one transducer, resistance or impedance of the at least one transducer, means for deploying the at least one transducer, material comprising the at least one shielding material member and configuration of the at least one shielding material member.

An electrical energizing unit may energize a single transducer with a pulsed electrical signal or energize a first transducer and a second transducer with a pulsed electrical signal. The electrical energizing unit may provide a plurality of distinct programmable outputs of electrical energy with each output of electrical energy establishing a distinct pulsed electrical signal, wherein a first pulsed electrical signal may energize a first transducer and a second pulsed electrical signal may energize a second transducer. The first pulsed electrical signal may have electrical characteristics substantially equivalent to the second pulsed electrical signal or the first pulsed electrical signal may have electrical characteristics distinct from the second pulsed electrical signal.

In some applications, it may be advantageous to utilize a first electrical energizing unit to energize a first transducer with a first pulsed electrical signal and a second electrical energizing unit to energize a second transducer with a second pulsed electrical signal. The second electrical energizing unit may establish a second pulsed electrical signal substantially equivalent in electrical characteristics to the first pulsed electrical signal or establish a second pulsed electrical signal having electrical characteristics distinct from the first pulsed electrical signal.

The at least one transducer may comprise at least one length of electrical conducting material forming at least one antenna. When energized with at least one pulsed electrical signal, the at least one antenna may produce at least one pulsed electromagnetic wave directing pulsed fluid treatment to at least one distinct region within the fluid treatment chamber. The at least antenna may be directional or omni-directional in function and enclosed within a housing to protect said antenna from corrosive feedstocks and debris in a feed stream that could affect the performance of the antenna or destroy the antenna.

Figure 4:
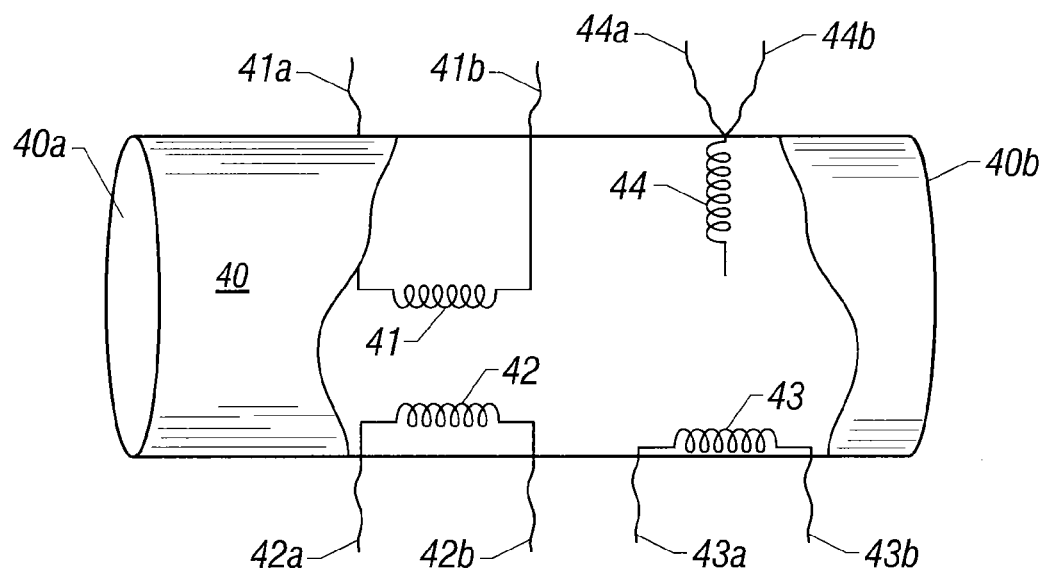
FIGS. 4 and 4A show embodiments of transducers disposed within and outside the fluid treatment chamber of a fluid treatment vessel.

As shown in FIG. 4, the preferred means of deploying the at least one antenna of the instant pulsed fluid treatment device is to dispose the at least one transducer within the fluid impervious boundary wall of the fluid treatment vessel. Fluid treatment vessel 40 is shown enclosing antenna 41 in substantially concentric surrounding relation with the transducer being coaxially disposed and radially spaced apart from the inner surface of the fluid impervious boundary wall of the fluid treatment chamber. A feed stream comprising a fluid column receptive to pulsed fluid treatment may be introduced to fluid input port 40a of the fluid treatment vessel to establish a flow of the fluid to be treated through the fluid treatment chamber, then directed to pass through at least one pulsed electromagnetic wave emitted by the antenna. The feed stream may then be discharged from fluid output port 40b of the fluid treatment vessel as a processed fluid.

Fluid treatment vessel 40 is also shown enclosing antenna 42 in substantially eccentric surrounding relation with the transducer disposed proximate and spaced apart from inner surface of the fluid impervious boundary wall of the fluid treatment chamber, and enclosing antenna 43 in substantially eccentric surrounding relation with the transducer disposed in fluid communication inner surface of the fluid impervious boundary wall of the fluid treatment chamber.

Antenna 44 is shown extending through the fluid impervious boundary wall of the fluid treatment vessel and into the fluid treatment chamber. The preferred means of deploying an antenna in this configuration is to dispose the transducer substantially orthogonal to the direction of the flow of fluid through the fluid treatment chamber; however, at least one antenna may be disposed substantially diagonal to the direction of the flow of fluid through the fluid treatment chamber. First and second conductor leads 41a and 41b, 42a and 42b, 43a and 43b or 44a and 44b of a transducer may be connected to at least one electrical energizing unit to energize a transducer with at least one pulsed electrical signal and thereby produce pulsed fluid treatment in at least one region within the fluid treatment chamber.

A fluid treatment vessel comprising a material having a capacity to restrict propagation of at least one pulsed electrical signal may form a shielding material member for the at least one antenna. In such instances, the inner surface of the fluid impervious boundary wall of the fluid treatment vessel may establish a resonant chamber for at least one pulsed electromagnetic wave produced by the at least one antenna.

The at least one transducer may comprise at least one magnetostrictive or at least one piezoelectric transducer. Mounting these types of transducers to a diaphragm, such as the fluid impervious boundary wall a fluid treatment vessel proximate the fluid treatment chamber, and applying at least one electrical signal to energize the transducer produces at least one pulsed electromagnetic field that causes the movement of the diaphragm, which in turn causes a pressure wave to be transmitted through fluid within the fluid treatment chamber. Similarly, a transducer enveloped by a material forming a diaphragm and deployed within a fluid treatment chamber may cause a pressure wave to be transmitted through fluid within the fluid treatment chamber.

Figure 4A:
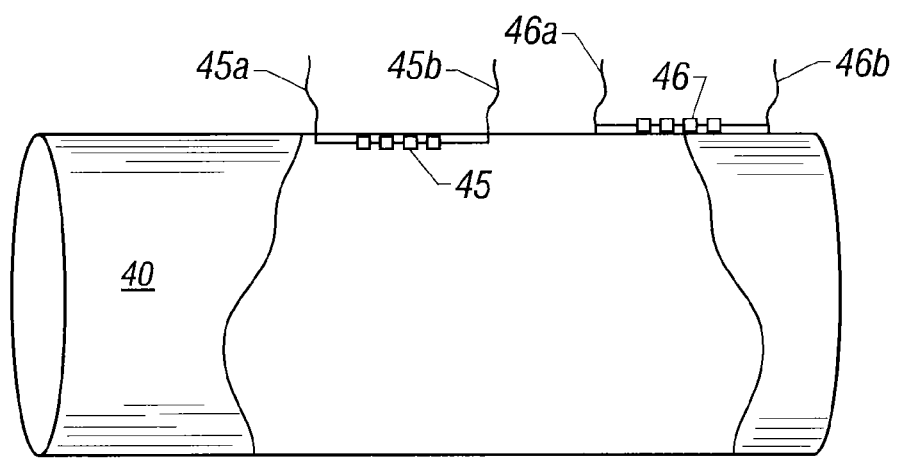

As shown in FIG. 4A, the preferred means for deploying a magnetostrictive or piezoelectric transducer is to affix said transducer 45 in fluid communication with the inner surface of the fluid impervious boundary wall of the fluid treatment vessel 40 proximate the fluid treatment chamber so that portion of said boundary wall forms a diaphragm. A transducer enveloped by a material forming a diaphragm having a capacity to cause a pressure wave to be transmitted through fluid within the fluid treatment chamber may similarly be deployed within the fluid treatment chamber. Some embodiments of fluid treatment vessel may define a fluid impervious boundary wall with an inner surface and an outer surface and having an input port and an output port. In such instances, at least one additional transducer 46 may also be disposed in fluid communication with the outer surface of the fluid impervious boundary wall of the fluid treatment vessel 40 so that portion of said boundary wall forms a diaphragm.

First and second conductor leads 45a and 45b or 46a and 46b may be connected to at least one electrical energizing unit to energize a transducer. When energized with at least one pulsed electrical signal, at least one pulsed electromagnetic field is generated that has a resonant point and frequency that causes a portion of the transducer to change shape and initiate the movement of the diaphragm. The pulsed movement of said diaphragm directs pulsed pressure waves through at least one distinct region within the fluid treatment chamber. The physical mass and shape of a transducer typically determines its resonant point and the repetition rate at which it will change shape. The inertial mass of a transducer, coupled with the acceleration of the transducer assembly and its ability to resonate in harmony with the pulsed electrical signal, determine the effectiveness of the pulsed fluid treatment.

The fluid treatment vessel, at least one transducer and at least one electrical energizing unit may be enclosed within a single shielding material member to restrict the radiation of the at least one pulsed electrical signal, or a shielding material member may enclose any combination the fluid treatment vessel, at least one transducer and at least one electrical energizing unit. Each of the fluid treatment vessel, the at least one transducer and the at least one electrical energizing unit may be enclosed within distinct and dedicated shielding material members so that each component may be individually shielded. For example, a length of coaxial cable, comprising an external braid of wire encircling at least one internal strand of electrical conducting material in substantially concentric surrounding relation, may be utilized as a conductor lead of said transducer and connected to the at least one shielded electrical energizing unit, wherein the external braid of wire forms a shielding material member to restrict the radiation of the at least one pulsed electrical signal transmitted through the at least one internal strand of electrical conductor. Other combinations and embodiments of shielding material members may be utilized.

A treated fluid may receive additional pulsed fluid treatment downstream of the instant invention. In some instances, at least one antenna may be disposed in fluid communication with the outer surface of a conduit promoting the flow of a processed fluid to provide additional pulsed fluid treatment. In other applications, a processed fluid may be retained in a collection basin, settling tank, retention pond or similar type of reservoir to allow for gravity separation of suspended and dissolved solids in the processed fluid column. At least one antenna may be deployed within said reservoir to direct additional pulsed fluid treatment to the processed fluid retained within the collection basin prior to discharging the fluid.

The instant invention includes a method of fluid treatment, comprising the steps of establishing a flow of a fluid to be treated along a path, the path extending through a fluid entry port at the proximal end of a magnetically conductive conduit having conduit; directing the flow of the fluid along a path extending through a treatment vessel having an input port, a fluid impervious boundary wall downstream of the fluid inlet port and a fluid outlet port downstream of the fluid impervious boundary wall; establishing a magnetic field having lines of flux directed along the flow path of the fluid and concentrated in a plurality of distinct areas along the longitudinal axis of the magnetically conductive conduit; and establishing pulsed fluid treatment proximate at least one region within the treatment vessel. The instant method may further comprise directing the fluid to pass through the fluid treatment vessel prior to passing through the magnetically conductive conduit.

The instant method may further comprise the step of directing the fluid to pass through at least one non-magnetically conductive fluid flow conduit to promote the flow of a fluid through the magnetically conductive conduit.

The instant method may further comprise means for deploying at least one shielding material member to restrict propagation of the at least one pulsed electrical signal, each at least one shielding material member having a capacity to restrict radiation of the at least one pulsed electrical signal, the at least one shielding material member further reducing external interference with the at least one pulsed electrical signal.

The instant method may further comprise at least one of the steps of dispersing at least one fluid treatment chemical into the fluid, directing the fluid through at least one contaminant separation process or directing the fluid through at least one fluid flow conditioning process.

The instant invention includes an apparatus providing fluid treatment, comprising a magnetic field treatment device comprising a magnetically conductive conduit to receive a flow of a fluid to be treated along a path extending at least partially through the magnetically conductive conduit, the magnetically conductive conduit having a fluid entry port at the proximal end of the conduit, at least one fluid impervious boundary wall downstream of the fluid entry port and a fluid discharge port at the distal end of the conduit; at least one electrical conductor comprising at least one length of an electrical conducting material having a first conductor lead and a second conductor lead, the electrical conductor coiled with at least one turn to form at least one uninterrupted coil of electrical conductor, each coil forming at least one layer of coiled electrical conductor; means for sleeving the magnetically conductive conduit within the coiled electrical conductor, whereby at least one turn of electrical conductor encircles at least a section of the outer surface of the magnetically conductive conduit with the coils oriented substantially orthogonal to the fluid flow; at least one electrical power supply operably connected to at least one conductor lead, wherein the at least one coiled electrical conductor is energized to produce a magnetic field having lines of flux directed along the fluid flow path and concentrated in a plurality of distinct areas along the longitudinal axis of the magnetically energized conduit; and a pulsed fluid treatment device comprising a fluid treatment vessel to receive a flow of the fluid to be treated, the fluid treatment vessel having a fluid input port, a fluid output port, and a fluid impervious boundary wall disposed therebetween, an inner surface of the fluid impervious boundary wall establishing a fluid treatment chamber; at least one transducer disposed within at least a portion of the fluid treatment chamber, the at least one transducer further having means for connecting to at least one electrical energizing unit, the at least one electrical energizing unit providing electrical output at a predetermined pulsed repetition rate to establish a pulsed electrical signal to energize the at least one transducer and establish pulsed fluid treatment proximate at least one distinct region within the treatment vessel; means for coupling the magnetic field treatment device and the pulsed fluid treatment device for fluid flow between them.

The lines of flux form loops and the magnetic field is of a strength that allows the flux to extend along the longitudinal axis of the magnetically conductive conduit and concentrate at distinct points beyond each end of each fluid impervious boundary wall such that the magnetic flux extends from a point where the lines of flux concentrate beyond one end of the magnetically conductive conduit, around the periphery of the coiled electrical conductor along the longitudinal axis of each fluid impervious boundary wall and to a point where the lines of flux concentrate beyond the other end of the magnetically conductive conduit. Each fluid impervious boundary wall absorbs the magnetic field and the magnetic flux loops generated by the coiled electrical conductor at the points of flux concentration.

The instant apparatus may further comprise at least one non-magnetically conductive fluid flow conduit to promote the flow of a fluid through the magnetically conductive conduit.

The instant apparatus may further comprise a coil core, said coil core comprising a tubular conduit defining a boundary wall with an inner surface and an outer surface and having a port at the proximal end of the tube and a port at the distal end of the tube, the outer surface of the boundary wall adapted to receive the coiled electrical conductor and the ports at each end of the tube and the inner surface of the boundary wall adapted to sleeve at least a section of the outer surface of the magnetically conductive conduit.

The instant apparatus may further comprise at least one magnetically conductive nucleus disposed within the aperture of the magnetically conductive conduit.

The instant apparatus may further comprise at least one shielding material member, each at least one shielding material member having a capacity to restrict radiation of the at least one pulsed electrical signal, the at least one shielding material member further reducing external interference with the at least one pulsed electrical signal.

The instant apparatus may further comprise a fluid treatment vessel comprising a material having a capacity to restrict propagation of the at least one pulsed electrical signal, the inner surface of the fluid impervious boundary wall of the fluid treatment vessel establishing a resonant chamber.

The instant apparatus may further comprise at least one chemical dispersing apparatus, each at least one dispersing apparatus providing means for distributing least one fluid treatment chemical into a fluid. The instant apparatus may further comprise at least one contaminant separation apparatus, each at least one separation apparatus providing means for separating and collecting a volume of contaminants from a fluid and discharging a processed fluid having a reduced volume of contaminants carried within the fluid. The instant apparatus may further comprise at least one fluid flow conditioning apparatus, each at least one fluid conditioning apparatus providing means for altering the flow of a fluid.

Figure 5:
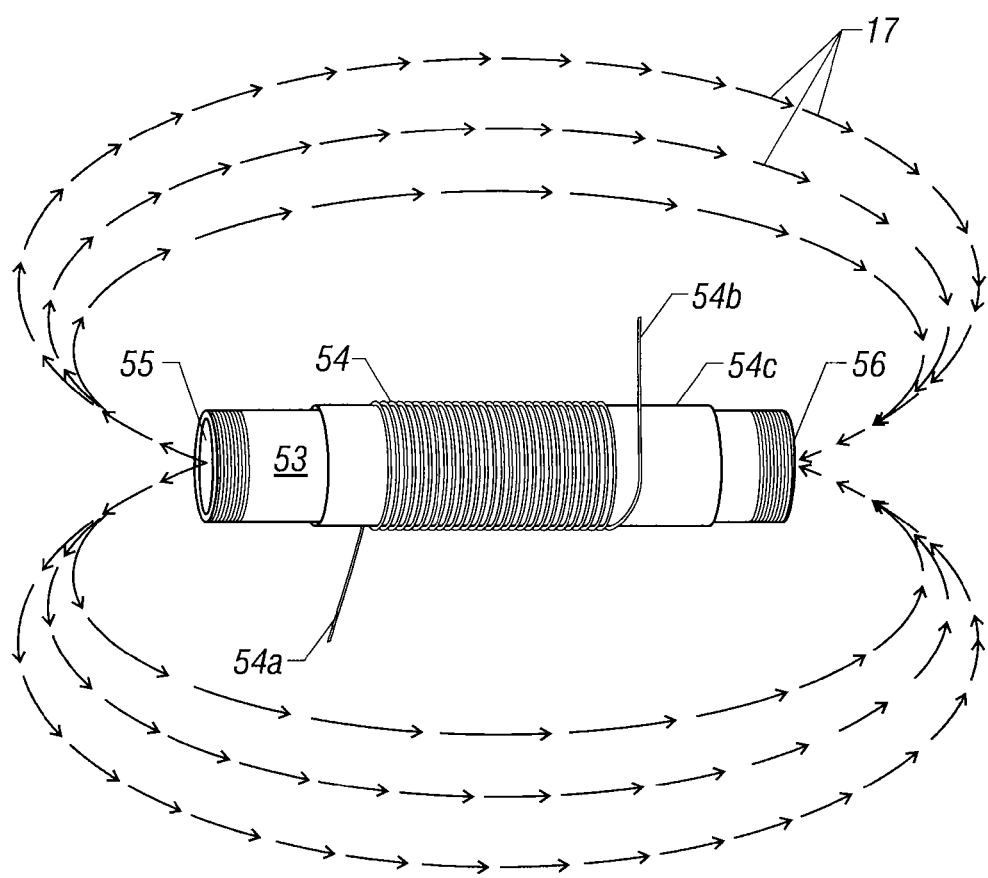
FIG. 5 shows the flow of pulsed magnetic flux loops encircling a length of magnetically energized conduit.

FIG. 5 shows the flow of magnetic flux loops 17 generated by energized coil 54 encircling coil core 54c, with the coil core shown sleeving a section of magnetically energized conduit 53. Operably connecting first conductor lead 54a and second conductor lead 54b to at least one supply of electrical power energizes the coiled electrical conductor and produces an electromagnetic field conducted by the magnetically conductive conduit and concentrated within the inner surface of the fluid impervious boundary wall of the conduit. However, to provide effective magnetic fluid treatment at a plurality of distinct points, the magnetic field must be of sufficient strength to extend beyond the ends of the length of the conduit. Magnetic flux loops 17 are shown consolidated at a point beyond inlet port 55 of magnetically energized conduit 53, flowing around the periphery of continuous coil 54 along the longitudinal axis of the conduit and reconsolidating at a point beyond outlet port 56 at the other end of the conduit. The magnetic field absorbed by magnetically conductive conduit 53 and the magnetic flux loops generated by the energized coil tend to concentrate in three distinct regions along a path extending through of the conduit; at inlet port 55, along the path extending through and substantially orthogonal to each turn of electrical conductor forming the energized coil 54 surrounding a section of the outer surface of conduit 53 and at outlet port 56. A fluid directed along a flow path extending through these three regions may receive magnetic treatment at a plurality of distinct points.

Figure 6:
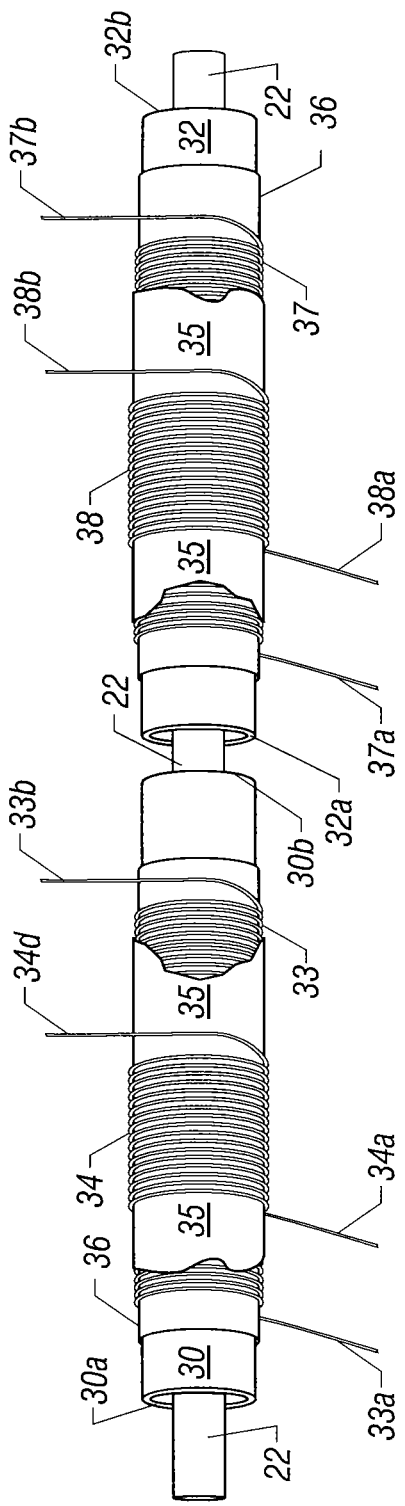
FIG. 6 shows a non-contiguous array of magnetically conductive conduits sleeving a non-magnetically conductive fluid flow conduit configured to provide pulsed magnetic fluid treatment at a plurality of distinct points.

FIG. 6 shows a non-contiguous array of first magnetically conductive conduit 30 and second magnetically conductive conduit 32. Fluid flow conduit 22, comprising a length of non-magnetically conductive material defining a fluid impervious boundary wall with an inner surface and an outer surface and having a fluid entry port at one end of the conduit and a fluid discharge port at the other end of the conduit, is shown extending through fluid entry port 30a at the proximal end of magnetically conductive conduit 30 and fluid discharge port 32b at a distal end of the magnetically conductive conduit 32 to establish a flow path for a fluid to be treated through the non-contiguous array of magnetically conductive conduits.

An electrical conductor comprising a first length of an electrical conducting material having first conductor lead 33a and second conductor lead 33b forms first coil layer 33 encircling coil core 36, a second length of an electrical conducting material having first conductor lead 34a and second conductor lead 34d forms second coil layer 34 encircling coil core 36, a third length of an electrical conducting material having first conductor lead 37a and second conductor lead 37b forms first coil layer 37 encircling coil core 36 and a fourth length of an electrical conducting material having first conductor lead 38a and second conductor lead 38b forms second coil layer 38 encircling coil core 36. Coil core 36 is shown sleeving a section of the outer surface of magnetically conductive conduit 30 and coil core 36 is shown sleeving a section of the outer surface of magnetically conductive conduit 32. A thin sheet of a non-magnetically conductive material 35 is shown disposed between the first and second layers of electrical conductor encircling the coil cores to maintain the alignment of the coil layers. At least one electrical power supply may be operably connected to at least one conductor lead to energize the coiled electrical conductor to produce a magnetic field having lines of flux directed along the fluid flow path.

Fluid flowing through non-magnetically conductive fluid flow conduit 22 may be directed to pass through a plurality of distinct areas of concentrated magnetic energy provided by the non-contiguous array of magnetically conductive conduits; a first region of fluid treatment in the magnetic field concentrated at inlet port 30a, a second region of magnetic treatment as the fluid is directed along a path extending through and substantially orthogonal to each turn of the electrical conductor forming the coils 33 and 34 encircling magnetically conductive conduit 30, a third region of magnetic treatment in the space between outlet port 30b and inlet port 32a, a fourth region of magnetic treatment along a path extending through and substantially orthogonal to each turn of the electrical conductor forming coils 37 and 38 encircling the outer surface of magnetically conductive conduit 32 and a fifth region of magnetic treatment concentrated at outlet port 32b.

Increasing the density and thickness of the fluid impervious boundary wall of the magnetically conductive conduit typically results in a greater concentration of magnetic energy at each end of a magnetically energized conduit and any non-magnetically conductive regions established between magnetically conductive conduits. FIG. 7 is an exploded view of first magnetically conductive conduit 53 comprising a fluid impervious boundary wall with an inner surface and an outer surface and having a fluid entry port at one end of the conduit and fluid discharge port at the other end of the conduit adapted to sleeve second magnetically conductive conduit 18. Electrical conductor 54 is shown encircling coil core 54c. Coil core 54c is shown sleeving a section of conduit 53 so that an uninterrupted coil of electrical conductor encircles a section of conduit 53.

Figure 7B:
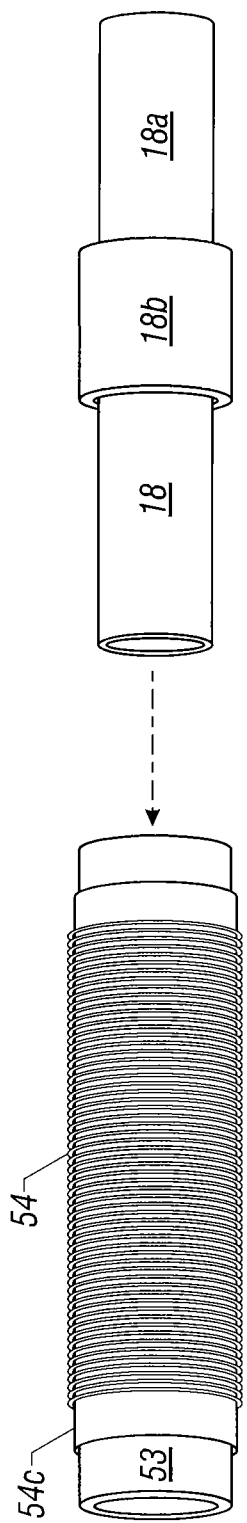
FIG. 7B is an exploded view of a first magnetically conductive conduit adapted to sleeve a serial coupling of conduit segments.

FIG. 7A is an exploded view of first magnetically conductive conduit 53 adapted to sleeve the non-contiguous array of second length of magnetically conductive conduit 18 and third length of magnetically conductive conduit 18a. Electrical conductor 54 is shown encircling coil core 54c. Coil core 54c is shown sleeving a section of conduit 53 so that an uninterrupted coil of electrical conductor encircles a section of conduit 53. FIG. 7B is an exploded view of first magnetically conductive conduit 53 adapted to sleeve the serial coupling of magnetically conductive inlet conduit 18, non-magnetically conductive conduit 18b and magnetically conductive outlet conduit 18a. Electrical conductor 54 is shown encircling coil core 54c. Coil core 54c is shown sleeving a section of conduit 53 so that an uninterrupted coil of electrical conductor encircles a section of conduit 53.

Figure 8:
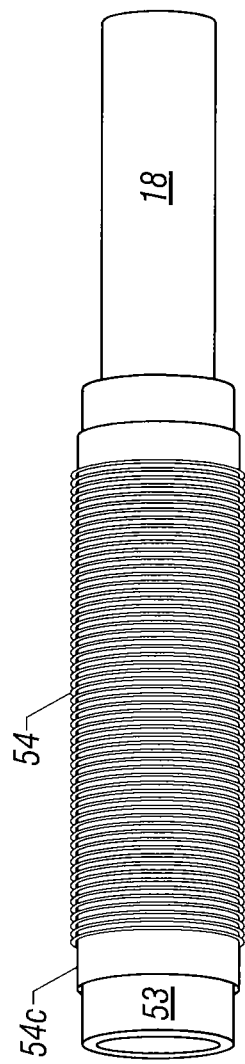
FIG. 8 shows a second magnetically conductive conduit being inserted in a first magnetically conductive conduit.

FIG. 8 shows second magnetically conductive conduit 18 being inserted into first magnetically conductive conduit 53. Electrical conductor 54 is shown encircling coil core 54c, with the coil core sleeving a section of conduit 53. A non-contiguous array of a first length of magnetically conductive conduit and a second length of magnetically conductive conduit or a serial coupling of a magnetically conductive inlet conduit, a non-magnetically conductive conduit and a magnetically conductive outlet conduit may be similarly inserted into first magnetically conductive conduit 53 wherein at least one segment of magnetically conductive conduit is sleeved within another at least one segment of magnetically conductive conduit.

Figure 9:
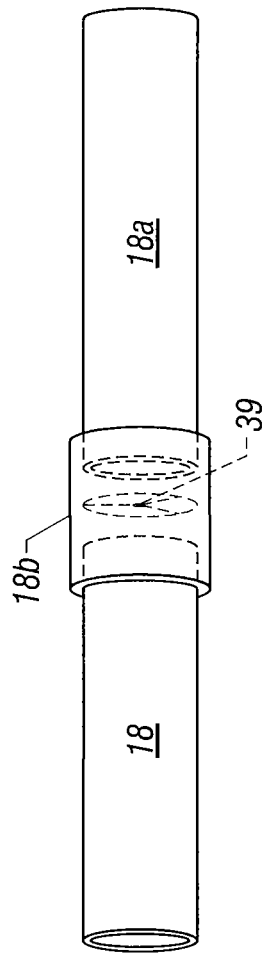
FIG. 9 shows a magnetically conductive nucleus disposed within the aperture of the non-magnetically conductive conduit a serial coupling of conduit segments.

FIG. 9 shows magnetically conductive nucleus 39 comprising a magnetically conductive material having an outer surface deployed within the aperture of non-magnetically conductive conduit 18b of a serial coupling of conduit segments, whereby the inner surface of the boundary walls of the magnetically conductive conduits 18 and 18a are coaxially disposed in substantially concentric surrounding relation to the outer surface of said magnetically conductive nucleus. Magnetically conductive inlet conduit 18 is shown upstream of non-magnetically conductive conduit 18b and magnetically conductive outlet conduit 18a is shown downstream of non-magnetically conductive conduit 18b.

Figure 10:
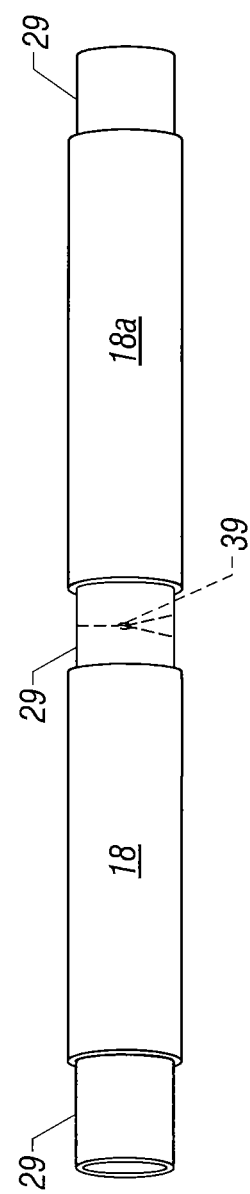
FIG. 10 shows a magnetically conductive nucleus disposed within the aperture of a non-magnetically conductive fluid flow conduit sleeved by exploded first and second magnetically conductive conduits.

FIG. 10 shows magnetically conductive nucleus 39 comprising a magnetically conductive material having an outer surface deployed within the aperture of non-magnetically conductive fluid flow conduit 29, whereby the inner surface of the boundary walls of the magnetically conductive conduits 18 and 18a are coaxially disposed in substantially concentric surrounding relation to the outer surface of the magnetically conductive nucleus.

Directing a feed stream to pass through the plurality of distinct areas of concentrated magnetic energy and at least one region of pulsed fluid treatment of the instant invention may neutralize the electrical charges of many suspended and dissolved solid contaminants in the feedstock, render them non-adhesive and enhance the clarification of the fluid. Water utilized as a heat transfer medium in thermal exchange systems, such as boilers, heat exchangers or cooling towers, may be directed through the concentrated magnetic energy and pulsed fluid treatment of the instant invention to retard the formation of scale and other heat insulating deposits in such thermal exchange systems. Directing sea water through the plurality of distinct areas of concentrated magnetic energy and at least one region of pulsed fluid treatment of the instant invention may be utilized improve the desalination of sea water and reverse osmosis systems. The instant invention may also be utilized to reduce the surface tension of irrigation water to allow for better penetration of the soil to feed the roots of plants.

Energized antennas, magnetostrictive transducers or piezoelectric transducers typically generate alternating positive and negative pressure waves that tend to tear fluids apart and create vacuum cavities that form micron-size bubbles. These bubbles continue to grow under the influence of the alternating positive and negative pressure waves until they reach a resonant size where they then collapse, or implode, under a force known as cavitation. Imploding bubbles form jets of plasma having extremely high temperatures that travel at high rates of speed for relatively short distances.

Energy released from a single cavitation bubble is extremely small, but the cavitation of millions of bubbles every second has a cumulative effect throughout the fluid as the pressure, temperature and velocity of the jets of plasma destroy many contaminants in a fluid. The resonant frequency of an energized transducer typically determines the size and magnitude of the cavitation bubbles, with the number of cavities formed typically increasing as the frequency increases.

Lower frequencies tend to create larger bubbles with more energy as the available power is concentrated in fewer bands of pulsed fluid treatment, while higher frequencies tend to produce smaller bubbles that distribute power more evenly throughout the fluid treatment chamber. Typically, a heavier transducer accelerating at a high repetition rate will produce more effective pulsed fluid treatment than a lighter transducer accelerating at a low repetition rate. Slight shifts in the resonant frequency of a transducer are preferred to enhance fluid treatment and the repetition rate of the electrical signal may be programmed to automatically vary on a constant basis. For example, a transducer designed to operate at 20 kHz may be driven by an electrical energizing unit sweeping 19-21 kHz to transform electrical energy into a signal suitable for generating fluid cavitation.

The physical properties of high density, low viscosity, middle range surface tension and middle range vapor pressure are ideal conditions for cavitation, with surface tension being a significant factor in determining the intensity of bubble cavitation. Feed streams that typically require a wetting agent to reduce the surface tension of a feed stock may be exposed to a plurality of distinct areas of concentrated magnetic energy upstream of the fluid treatment chamber to provide the desired reduction in the surface tension of the feed stream.

In certain applications, diffused ambient air or other forms of small bubbles may be introduced immediately upstream of the fluid treatment chamber to assist in initiating the cavitation process. Electrolysis of a feedstock may also be utilized to generate small bubbles in a feed stream by energizing at least one pair of electrodes with electrical energy. An electrode may comprise an electrical conducting material having at least one conductor lead, each pair of electrodes configured as a substantially parallel array of spaced-apart plates interleaving to form at least one cavity between the facing surfaces of adjacent plates.

Each electrode plate may be energized with an electrical charge opposite from its adjacent plate. The conductivity of a feedstock typically influences the voltage required to maintain the level of current required to energize the electrodes. Electron flow between the charged plates, along with electromagnetic field generation, releases oxygen and hydrogen bubbles from many water-based feedstocks that may be useful in initiating the cavitation process. Electrodes may be energized with electrical energy having an alternating current component or a direct current component. When energizing electrodes with electrical energy having a direct current component, the polarity of the signal applied to such electrodes may be periodically reversed to reduce the plating of contaminants on the surfaces of the electrodes. In certain applications, a pulsed fluid treatment device or a magnetic field treatment device may be configured upstream of the electrodes to retard plating of the electrodes.

Most biological contaminants regulate their water intake through osmosis via the electrical charge of fats and proteins in their surface membranes. Directing biological contaminants to pass through the instant invention may overwhelm the electrical fields and charges in the surface membranes of these microorganisms and drive them to an imbalanced state, weakening their cell walls and destroying the membranes. Unlike chemical treatment and other means of controlling many biological contaminants, many organisms may not develop immunity to the instant method of fluid treatment. The additional use of charged electrodes may provide even more effective means of destroying biological contaminants in fluids.

The instant invention may be utilized to break many oil/water emulsions. The concentrated magnetic energy of the magnetic field treatment device may be used to reduce the surface charges of small oil droplets suspended in the water and enhance their interfacial tension so that the water repels the oil and the oil repels the water. In instances where at least one electrical power supply provides at least one pulsed output of electrical energy to produce a pulsed magnetic field, the concentrated areas of pulsed magnetic energy may be used to agitate the interface between the water and oil droplets and puncture the bond creating the emulsion to allow small oil droplets to coalesce into larger droplets. Larger oil droplets may then float out of the water and be removed by separation apparatus. Treatment provided by the fluid treatment device may be utilized to neutralize the charges of many suspended and dissolved solid contaminants that tend to stabilize emulsions. Pulsed fluid treatment may be further utilized to direct alternating pressure waves through a mixture of oil and water to disrupt the stability of the emulsion and allow small oil droplets to coalesce into larger oil droplets, float out of the water and be removed by separation apparatus.

Similarly, water may be removed from hydrocarbon fluids. At least one pair of charged electrodes may be utilized in concert with the instant invention to break many of the bonds that tend to create many types of emulsions.

Coagulating chemicals are typically used to neutralize the electrical charges of particles suspended in a fluid column. Directing a feedstock to pass through the instant invention may cause suspended and dissolved contaminants in a feed stream to be repelled from the fluid and facilitate removal of solid contaminants, and may thereby reduce the amount of coagulants required for adequate processing of a fluid. Flocculants are commonly injected into wastewater sludge upstream of dewatering equipment and mixed into a feedstock to promote the aggregation of finely dispersed solids suspended in wastewater into particles large enough to be removed by physical separation. Pretreatment of wastewater by the instant invention may result in a reduction of the amount of flocculating polymer required for processing a feed stream while simultaneously generating drier solids and clearer filtrate discharged from dewatering equipment.

At least one chemical dispersing apparatus providing means for distributing a supply of at least one fluid treatment chemical into a fluid directed to pass through a treatment device may be utilized to disperse a supply of at least one chemical into a feed stream upstream of the magnetic field treatment device, downstream of the magnetic field treatment device, upstream of the pulsed fluid treatment device or downstream of the pulsed fluid treatment device. Fluid treatment chemicals may be selected from a group consisting of, but not limited to, algaecides, biocides, scale retardants, coagulants, flocculants, pesticides, fertilizers, coolants, air, oxygen, hydrogen, ozone, hydrogen peroxide, surfactants, petroleum production fluid additives, fuel additives and lubricant additives. As used herein, charged electrodes generating oxygen and hydrogen bubbles in the electrolysis of water-based feedstocks may comprise a chemical dispersing apparatus.

In some instances, chemical pretreatment may hamper the efficiency of separation apparatus, such as screening devices that tend to blind off with chemically treated feedstocks, and hydrocyclones, desanders and desilters. Improved removal of suspended and dissolved solid contaminants from a fluid may be achieved by directing a feed stream free of coagulants or flocculants to pass through the instant invention upstream of such apparatus to enhance the separation of solids from the fluid.

At least one contaminant separation apparatus providing means for separating and collecting a volume of contaminants from a fluid and discharging a processed feed stream having a reduced volume of contaminants carried within a treated fluid column may be utilized to treat a feed stream upstream of the magnetic field treatment device, downstream of the magnetic field treatment device, upstream of the pulsed fluid treatment device or downstream of the pulsed fluid treatment device. Contaminant separation apparatus may be selected from a group consisting of, but not limited to, phase separation systems, solids separation equipment, dewatering devices, oil/water separators, petroleum production equipment, petroleum refining systems, water filters, desalination equipment, reverse osmosis systems, fuel filters and lubricant filters.

At least one fluid flow conditioning apparatus providing means for altering the flow of a fluid directed to pass through a treatment device may be utilized to alter the flow of a feed stream upstream of the pulsed fluid treatment device or downstream of the pulsed fluid treatment device. Fluid conditioning apparatus may be selected from a group consisting of, but not limited to, pumps, blowers, vortex inducing equipment, static mixing devices and dynamic mixing apparatus to create turbulence in a flow of fluid or laminar flow conditioners to remove turbulence from a flow of fluid.

Thus, the instant invention includes a method of fluid treatment comprising the steps of establishing a flow of a fluid to be treated along a path, the path extending through a magnetically conductive conduit; directing the flow of the fluid along a path extending through a treatment vessel; establishing a magnetic field having lines of flux directed along the fluid flow path and concentrated in a plurality of distinct areas along the longitudinal axis of the magnetically energized conduit; and establishing pulsed fluid treatment proximate at least one region within the treatment vessel. The instant method may further comprise directing the fluid to pass through the fluid treatment vessel prior to passing through the magnetically conductive conduit.

The instant method may further comprise the step of directing the fluid to pass through at least one non-magnetically conductive fluid flow conduit to promote the flow of a fluid through the magnetically conductive conduit.

The instant method may further comprise means for deploying at least one shielding material member to restrict propagation of the at least one pulsed electrical signal, each at least one shielding material member having a capacity to restrict radiation of the at least one pulsed electrical signal, the at least one shielding material member further reducing external interference with the at least one pulsed electrical signal.

Further, the instant invention includes an apparatus providing fluid treatment comprising a magnetic field treatment device comprising a magnetically conductive conduit to receive a flow of a fluid to be treated along a path extending at least partially through the magnetically conductive conduit, at least one electrical conductor comprising at least one length of an electrical conducting material having a first conductor lead and a second conductor lead, the electrical conductor coiled with at least one turn to form at least one uninterrupted coil of electrical conductor, each coil forming at least one layer of coiled electrical conductor; means for sleeving the magnetically conductive conduit within the coiled electrical conductor, whereby at least one turn of electrical conductor encircles at least a section of the outer surface of the magnetically conductive conduit with the coils oriented substantially orthogonal to the fluid flow; at least one electrical power supply operably connected to at least one conductor lead, wherein the at least one coiled electrical conductor is energized to produce a magnetic field having lines of flux directed along the fluid flow path and concentrated in a plurality of distinct areas along the longitudinal axis of the magnetically energized conduit; and a pulsed fluid treatment device comprising a fluid treatment vessel to receive a flow of a fluid to be treated, the fluid treatment vessel having a fluid treatment chamber disposed therein; at least one transducer disposed within at least a portion of the fluid treatment chamber, the at least one transducer further having means for connecting to at least one electrical energizing unit, the at least one electrical energizing unit providing electrical output at a predetermined pulsed repetition rate to establish a pulsed electrical signal to energize the at least one transducer and establish pulsed fluid treatment proximate at least one distinct region within the treatment vessel; and means for coupling the magnetic field treatment device and the pulsed fluid treatment device for fluid flow between them.

The instant apparatus may further comprise at least one non-magnetically conductive fluid flow conduit to promote the flow of a fluid through the magnetically conductive conduit.

The instant apparatus may further comprise a magnetically conductive conduit selected from a group including a length of magnetically conductive material defining a fluid impervious boundary wall with an inner surface and an outer surface and having a port at the proximal end of the conduit and a port at the distal end of the conduit, a non-contiguous array of a first length of magnetically conductive conduit and a second length of magnetically conductive conduit, a serial coupling of a magnetically conductive inlet conduit, a non-magnetically conductive conduit and a magnetically conductive outlet conduit and at least one segment of magnetically conductive conduit sleeved within another at least one segment of magnetically conductive conduit.

The instant apparatus may further comprise a coil core, the outer surface of the coil core adapted to receive the coiled electrical conductor and the ports at each end of the coil core and the inner surface of the coil core adapted to sleeve at least a section of the outer surface of the magnetically conductive conduit. The instant apparatus may further comprise at least one magnetically conductive nucleus disposed within the aperture of the magnetically conductive conduit.

The instant apparatus may further comprise means for deploying at least one shielding material member to restrict propagation of the at least one pulsed electrical signal, each at least one shielding material member having a capacity to restrict radiation of the at least one pulsed electrical signal, the at least one shielding material member further reducing external interference with the at least one pulsed electrical signal.

The foregoing description of the preferred embodiment has been for the purpose of explanation and illustration. It will be appreciated by those skilled in the art that modifications and changes may be made without departing from the essence and scope of the present invention. For example, additional embodiments of energized coils may be utilized to induce a magnetic field for fluid treatment. Therefore, it is contemplated that the appended claims will cover any modifications or embodiments that fall within the scope of the invention.

What is claimed is:

1. An apparatus for providing magnetic fluid treatment, comprising:
   a serial coupling of conduit segments, the serial coupling forming a conduit having a fluid entry port, a fluid impervious boundary wall and a fluid discharge port defining a fluid impervious flow path through the conduit, at least two of the conduit segments constructed of a magnetically conductive material and at least one of the conduit segments constructed of a non-magnetically conductive material, each conduit segment defining a fluid impervious boundary wall with an inner surface and an outer surface and having a fluid entry port at one end of the conduit segment and a fluid discharge port at the other end of the conduit segment, each magnetically conductive conduit segment establishing a magnetically conductive region and each non-magnetically conductive conduit segment establishing a non-magnetically conductive region wherein at least one non-magnetically conductive conduit segment is positioned between two magnetically conductive conduit segments; and
   at least one electrical conductor comprising at least one length of an electrical conducting material having a first conductor lead and a second conductor lead, the electrical conductor coiled with at least one turn to form at least one uninterrupted coil of electrical conductor encircling at least a section of the outer surface of the serial coupling of conduit segments and oriented substantially orthogonal to the fluid flow path, wherein energizing the at least one electrical conductor establishes a magnetic field having lines of flux directed along the flow path and concentrated in the non-magnetically conductive area between the fluid entry port and the fluid discharge port of the conduit.

2. The apparatus of claim 1, wherein at least one electrical conductor is coiled around the outer surface of at least one magnetically conductive conduit segment.

3. The apparatus of claim 1, wherein at least one electrical conductor is coiled around the outer surface of at least two magnetically conductive conduit segments.

4. The apparatus of claim 3, wherein a first electrical conductor forms at least one uninterrupted coil of electrical conductor encircling at least a section of the outer surface of a first magnetically conductive conduit segment and a second electrical conductor forms at least one uninterrupted coil of electrical conductor encircling at least a section of the outer surface of a second magnetically conductive conduit segment.

5. The apparatus of claim 1, further comprising at least one coil core, said coil core comprising a tubular conduit defining a boundary wall with an inner surface and an outer surface and having a port at a proximal end of the tubular conduit and a port at a distal end of the tubular conduit, the outer surface of the boundary wall receiving the at least one coiled electrical conductor and the ports at the proximal and distal ends of the tubular conduit and the inner surface of the boundary wall sleeving at least a section of the outer surface of the serial coupling of conduit segments.

6. The apparatus of claim 1, wherein at least one of the two magnetically conductive conduit segments has a tapered end, said tapered end oriented to form a coupling between the at least one of the two magnetically conductive conduit segments and a non-magnetically conductive conduit segment.

7. The apparatus of claim 1, further comprising at least one magnetically conductive sleeving conduit, each at least one magnetically conductive sleeving conduit comprising a magnetically conductive material having a boundary wall with an inner surface and an outer surface and having a port at one end of the magnetically conductive sleeving conduit and port at the other end of the magnetically conductive sleeving conduit sleeving the serial coupling of conduit segments, whereby at least a section of the inner surface of the boundary wall of the magnetically conductive sleeving conduit is coaxially disposed in substantially concentric surrounding relation to at least a section of the outer surface of the boundary wall of at least one magnetically conductive conduit segment in the serial coupling of conduit segments.

8. The apparatus of claim 7, wherein at least a section of the inner surface of the boundary wall of the magnetically conductive sleeving conduit is coaxially disposed in substantially concentric surrounding relation to at least a section of the outer surface of the boundary wall of a first segment of the magnetically conductive conduit segments, the outer surface of the boundary wall of the non-magnetically conductive conduit segment and at least a section of the outer surface of the boundary wall of a second segment of the magnetically conductive conduit segments in the serial coupling of conduit segments.

9. The apparatus of claim 7, wherein at least a section of the inner surface of the boundary wall of a first magnetically conductive sleeving conduit is coaxially disposed in substantially concentric surrounding relation to at least a section of the outer surface of the boundary wall of a first magnetically conductive conduit segment in the serial coupling of conduit segments and at least a section of the inner surface of the boundary wall of a second magnetically conductive sleeving conduit is coaxially disposed in substantially concentric surrounding relation to at least a section of the outer surface of the boundary wall of a second magnetically conductive conduit segment in the serial coupling of conduit segments.

10. The apparatus of claim 7, wherein the outer surface of at least one magnetically conductive sleeving conduit is encircled by the at least one coiled electrical conductor.

11. The apparatus of claim 7, further comprising at least one coil core encircled by the at least one coiled electrical conductor, and wherein at least a section of the inner surface of the boundary wall of at least one coil core is coaxially disposed in substantially concentric surrounding relation to at least a section of the outer surface of the boundary wall of a magnetically conductive sleeving conduit.

12. The apparatus of claim 1, further comprising at least one nucleus having an outer surface, said nucleus disposed within the serial coupling of conduit segments.

13. An apparatus for providing magnetic fluid treatment, comprising:
   a serial coupling of conduit segments, the serial coupling forming a conduit having a fluid entry port, a fluid impervious boundary wall and a fluid discharge port defining a fluid impervious flow path through the conduit, at least two of the conduit segments constructed of a magnetically conductive material and at least one of the conduit segments constructed of a non-magnetically conductive material, each conduit segment defining a fluid impervious boundary wall with an inner surface and an outer surface and having a fluid entry port at one end of the conduit segment and a fluid discharge port at the other end of the conduit segment, each magnetically conductive conduit segment establishing a magnetically conductive region and each non-magnetically conductive conduit segment establishing a non-magnetically conductive region wherein at least one non-magnetically conductive conduit segment is positioned between two magnetically conductive conduit segments; and
   at least one electrical conductor comprising at least one length of an electrical conducting material having a first conductor lead and a second conductor lead, the electrical conductor coiled with at least one turn to form at least one uninterrupted coil of electrical conductor encircling at least a section of the outer surface of the serial coupling of conduit segments, wherein energizing the at least one electrical conductor establishes a magnetic field having lines of flux directed along the flow path and concentrated in the non-magnetically conductive area between the fluid entry port and the fluid discharge port of the conduit.

14. The apparatus of claim 13, wherein at least one electrical conductor is coiled around the outer surface of at least one magnetically conductive conduit segment.

15. The apparatus of claim 13, wherein at least one electrical conductor is coiled around the outer surface of at least two magnetically conductive conduit segments.

16. The apparatus of claim 13, wherein a first electrical conductor forms at least one uninterrupted coil of electrical conductor encircling at least a section of the outer surface of a first magnetically conductive conduit segment and a second electrical conductor forms at least one uninterrupted coil of electrical conductor encircling at least a section of the outer surface of a second magnetically conductive conduit segment.

17. The apparatus of claim 13, further comprising at least one coil core, said coil core comprising a tubular conduit defining a boundary wall with an inner surface and an outer surface and having a port at a proximal end of the tubular conduit and a port at a distal end of the tubular conduit, the outer surface of the boundary wall receiving the at least one coiled electrical conductor and the ports at the proximal and distal ends of the tubular conduit and the inner surface of the boundary wall sleeving at least a section of the outer surface of the serial coupling of conduit segments.

18. The apparatus of claim 13, wherein at least one of the two magnetically conductive conduit segments has a tapered end, said tapered end oriented to form a coupling between the at least one of the two magnetically conductive conduit segments and a non-magnetically conductive conduit segment.

19. The apparatus of claim 13, further comprising at least one chemical dispersing apparatus coupled to the serial coupling of conduit segments upstream of the serial coupling of conduit segments.

20. The apparatus of claim 13, further comprising at least one chemical dispersing apparatus coupled to the serial coupling of conduit segments downstream of the serial coupling of conduit segments.

21. The apparatus of claim 13, further comprising at least one separation apparatus coupled to the serial coupling of conduit segments upstream of the serial coupling of conduit segments.

22. The apparatus of claim 13, further comprising at least one separation apparatus coupled to the serial coupling of conduit segments downstream of the serial coupling of conduit segments.

23. The apparatus of claim 13, further comprising at least one flow conditioning apparatus coupled to the serial coupling of conduit segments upstream of the serial coupling of conduit segments.

24. The apparatus of claim 13, further comprising at least one flow conditioning apparatus coupled to the serial coupling of conduit segments downstream of the serial coupling of conduit segments.

\* \* \* \* \*